United States Patent [19]

Everett et al.

[11] 4,380,819
[45] Apr. 19, 1983

[54] SPOTFILMING APPARATUS

[75] Inventors: Dennis Everett, Garfield Heights; Vjekoslav Jukic, Cleveland, both of Ohio

[73] Assignee: Picker Corporation, Cleveland, Ohio

[21] Appl. No.: 209,739

[22] Filed: Nov. 24, 1980

[51] Int. Cl.³ .............................................. G21F 5/04
[52] U.S. Cl. .................................. 378/114; 378/152; 378/175
[58] Field of Search ...................... 250/512, 513, 471; 378/175, 151, 152, 153, 114

[56] References Cited

U.S. PATENT DOCUMENTS

| | | | |
|---|---|---|---|
| 2,492,031 | 12/1949 | Blatz et al. | 250/513 |
| 2,806,146 | 9/1957 | Thompson | 250/512 |
| 3,502,878 | 3/1970 | Stewart et al. | 250/512 |
| 4,099,063 | 7/1978 | Pury et al. | 250/513 |

Primary Examiner—Alfred E. Smith
Assistant Examiner—T. N. Grigsby

[57] ABSTRACT

A masking apparatus and palpitator cone drive system for an X-ray spotfilming device. The masking apparatus comprises first and second pairs of shutter-like members mounted for reciprocating movement in two mutually orthogonal directions. Each mask member of the second pair includes first and second relatively moveable elements that operate in a telescope-like manner. A drive system including a reversible motor and a feedback potentiometer actuates the elements at first and second speeds so that the elements reach their retracted and extended positions simultaneously. The cone drive system includes a drive motor, a drive belt and drive assembly for driving the cone between retracted and operative positions. A cone lock is engageable with a keeper located at a cone-advanced position of the drive assembly and is released by the drive belt whenever the drive motor is energized in the cone-retracting direction.

12 Claims, 38 Drawing Figures

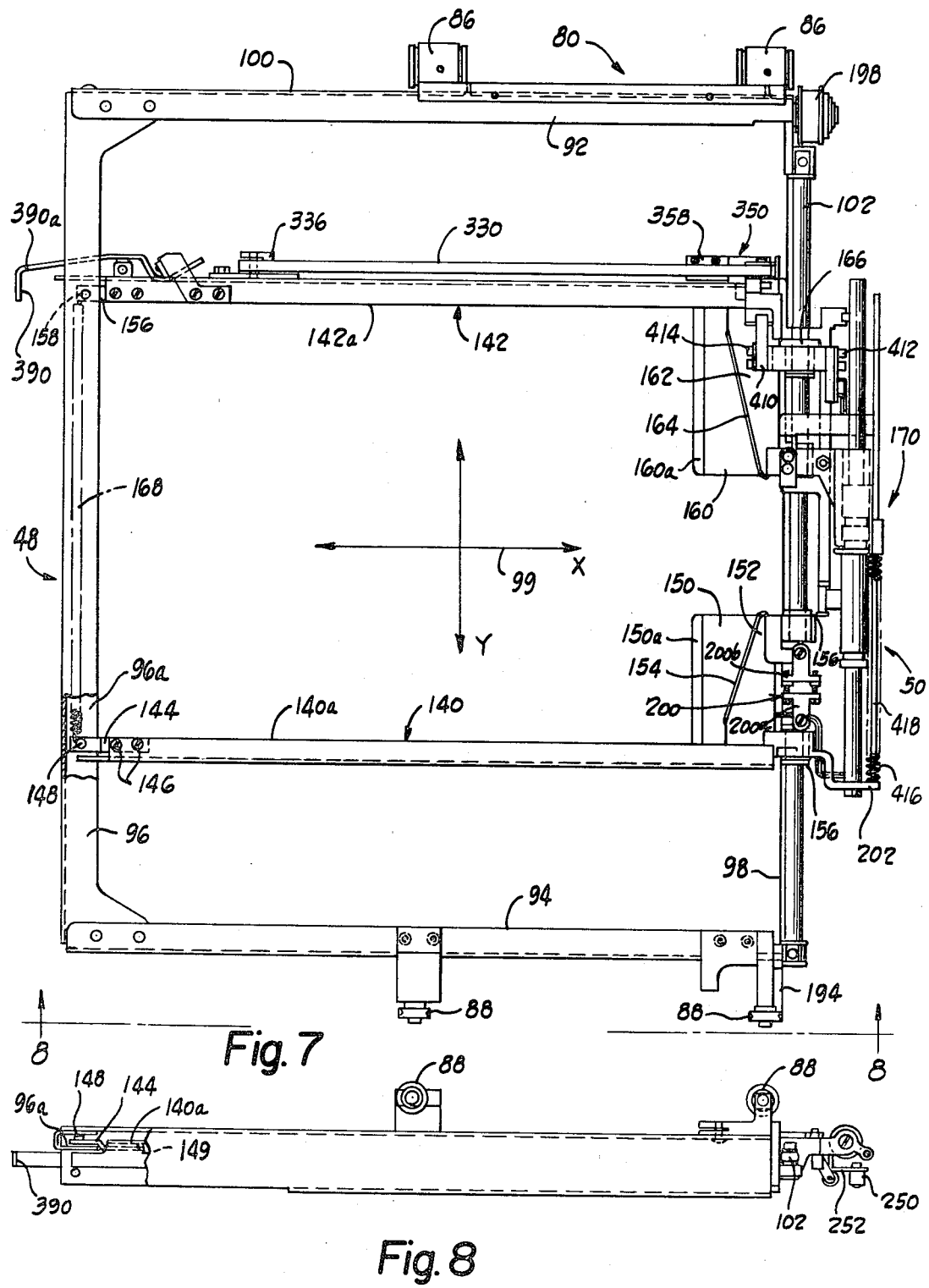

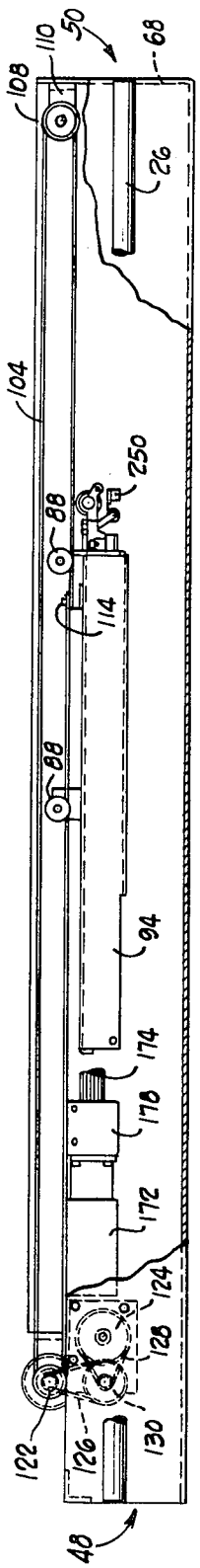
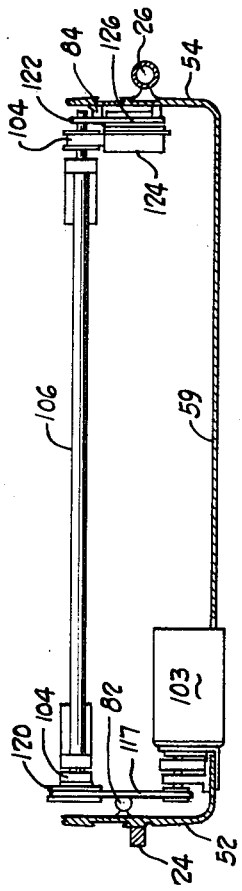
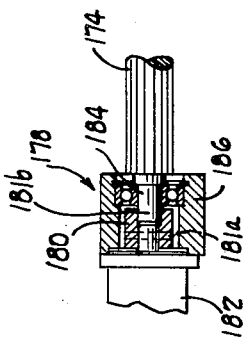
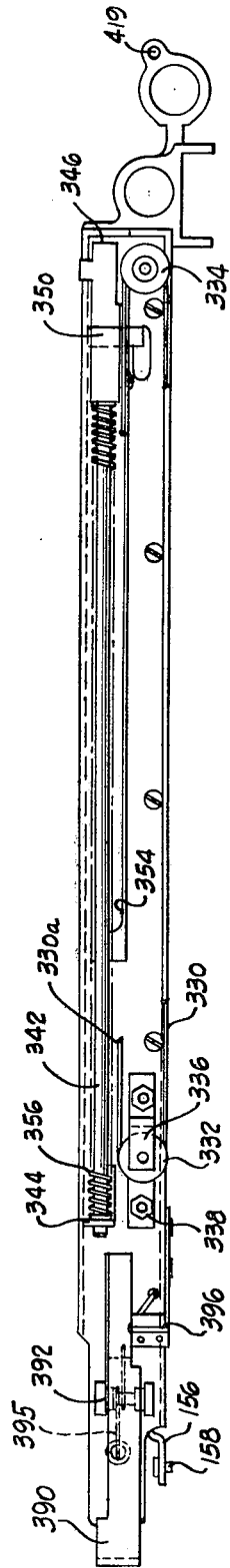
Fig. 9
Fig. 10
Fig. 13
Fig. 23

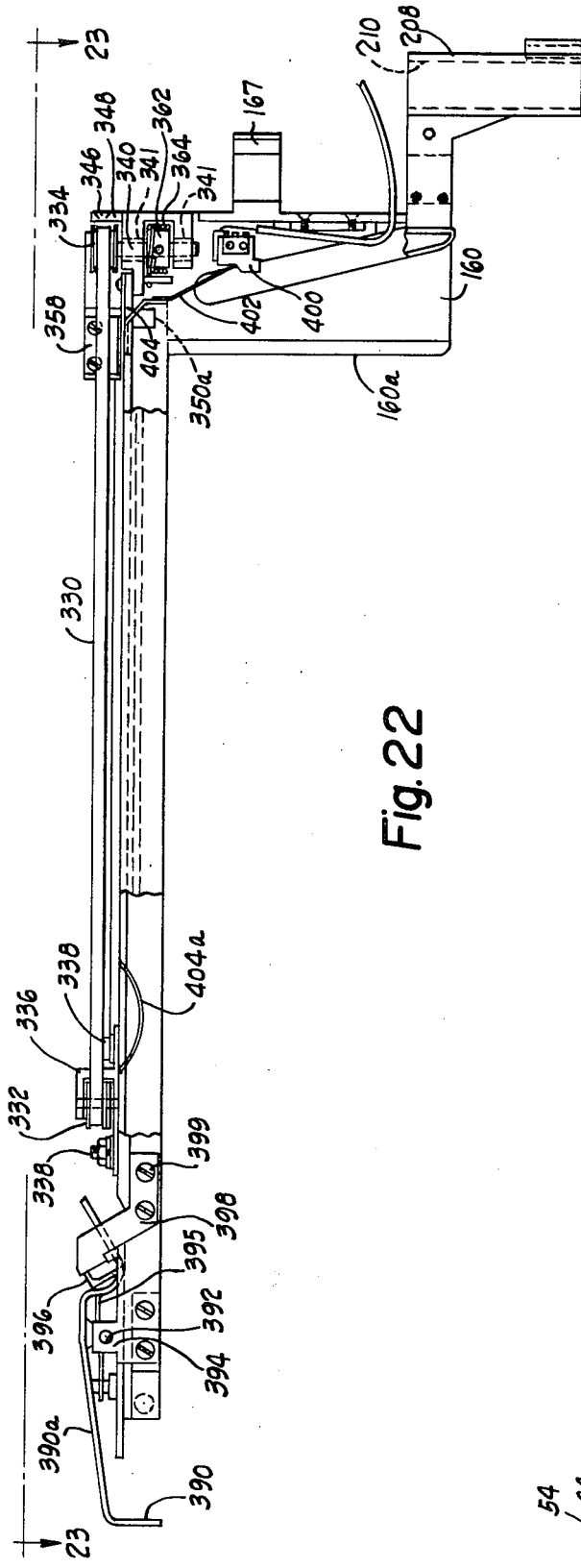
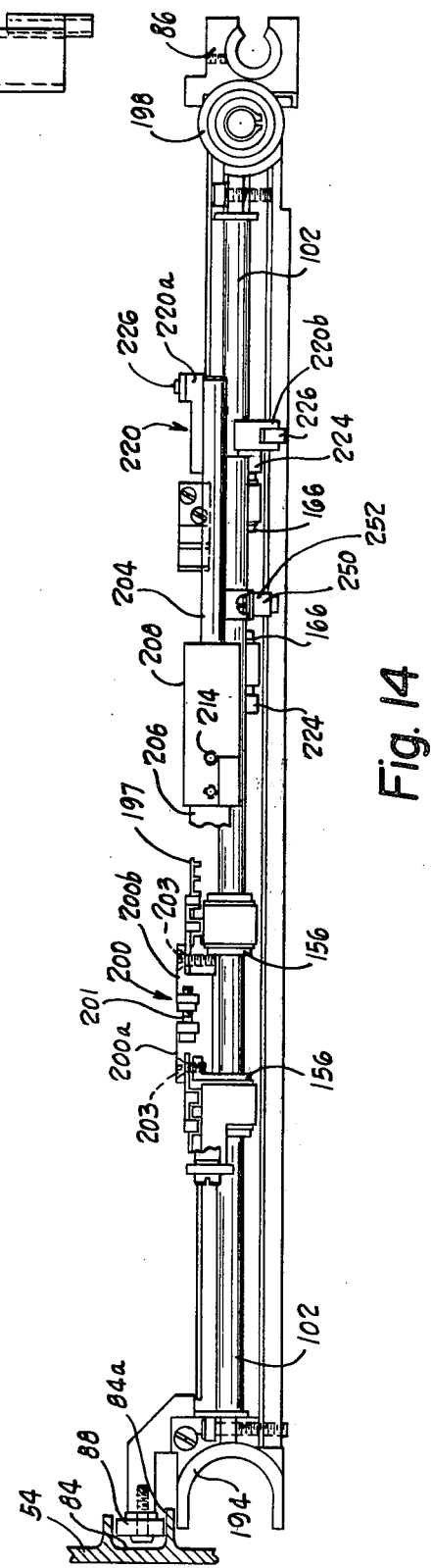
Fig.22
Fig.14

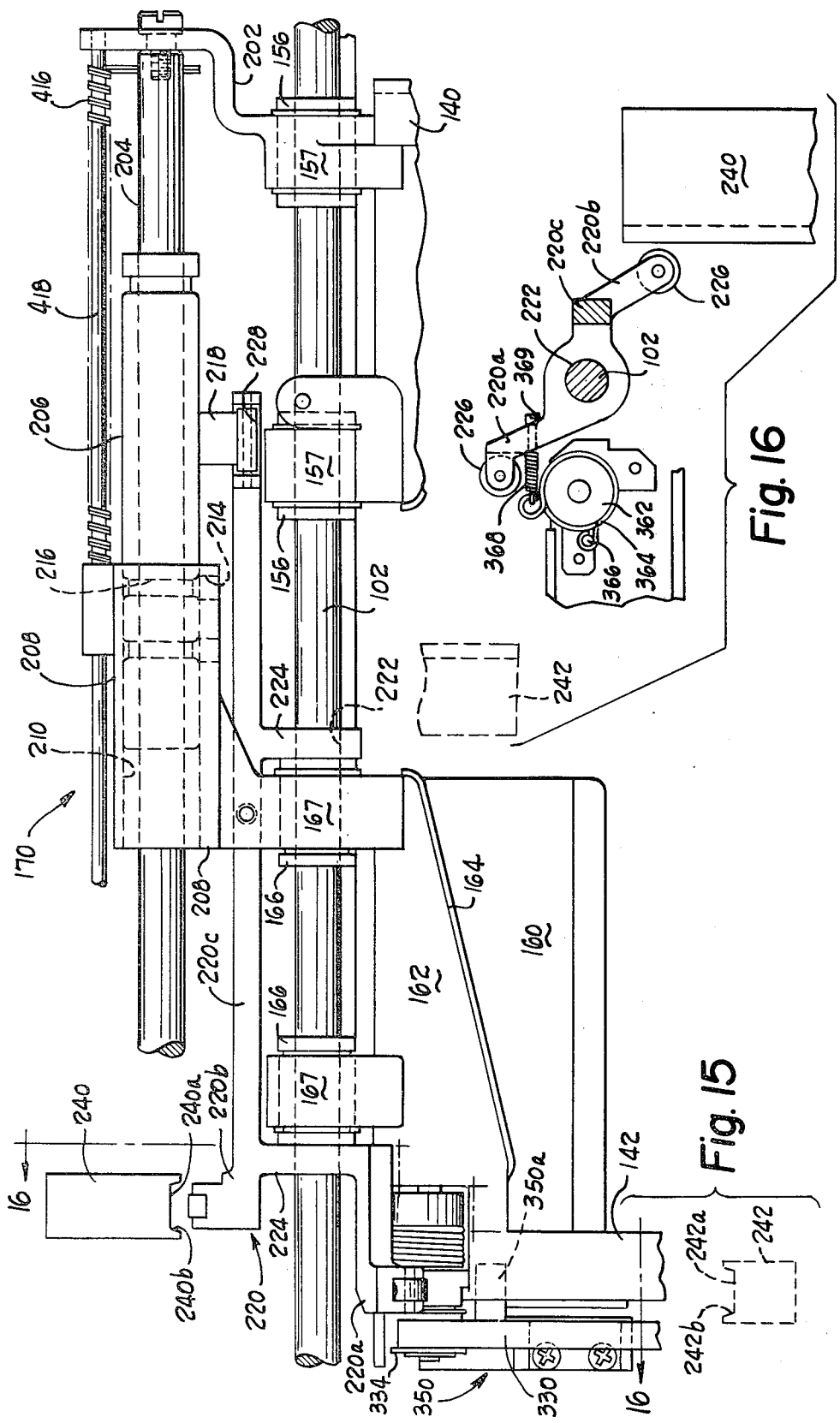

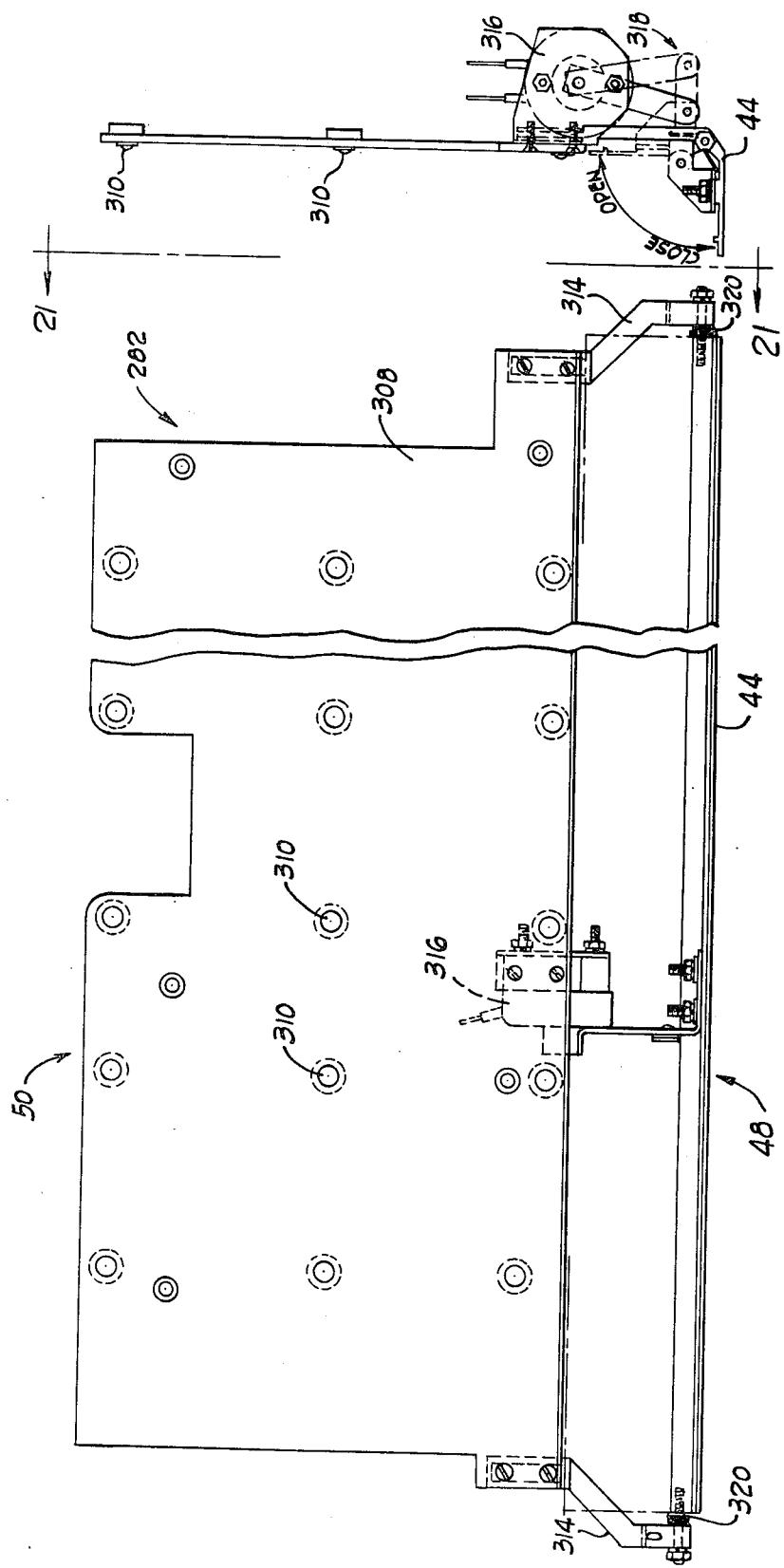

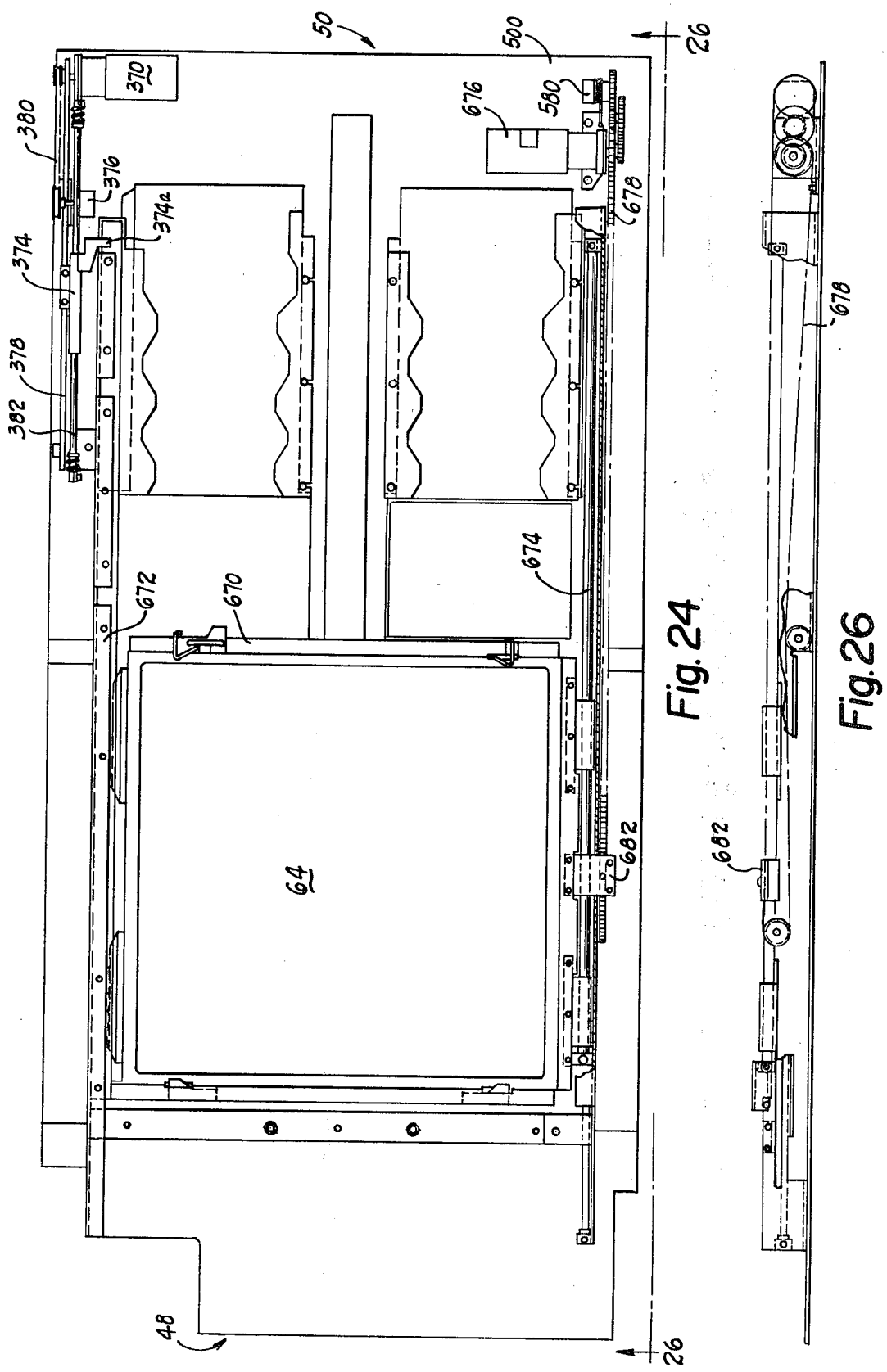

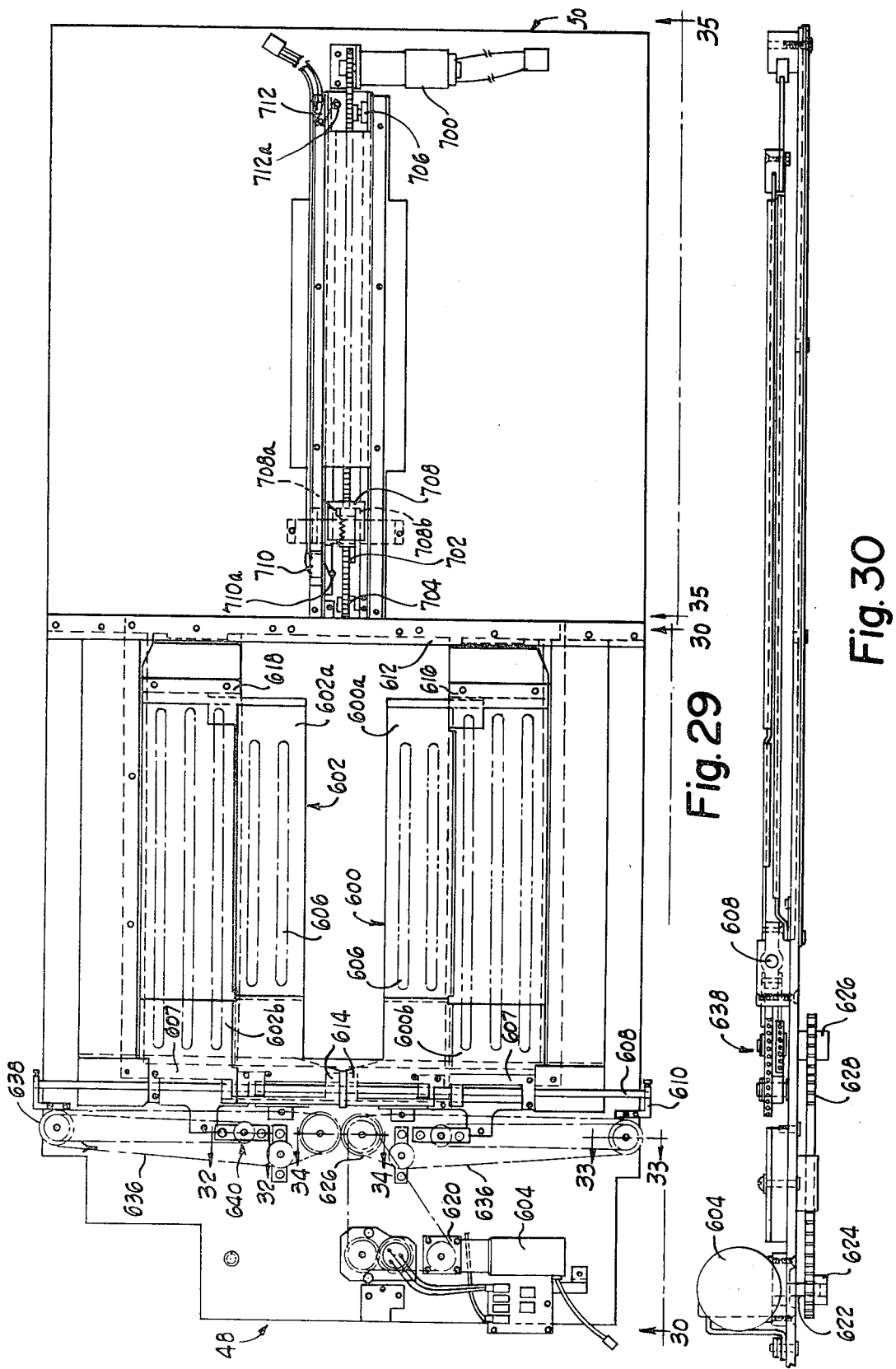

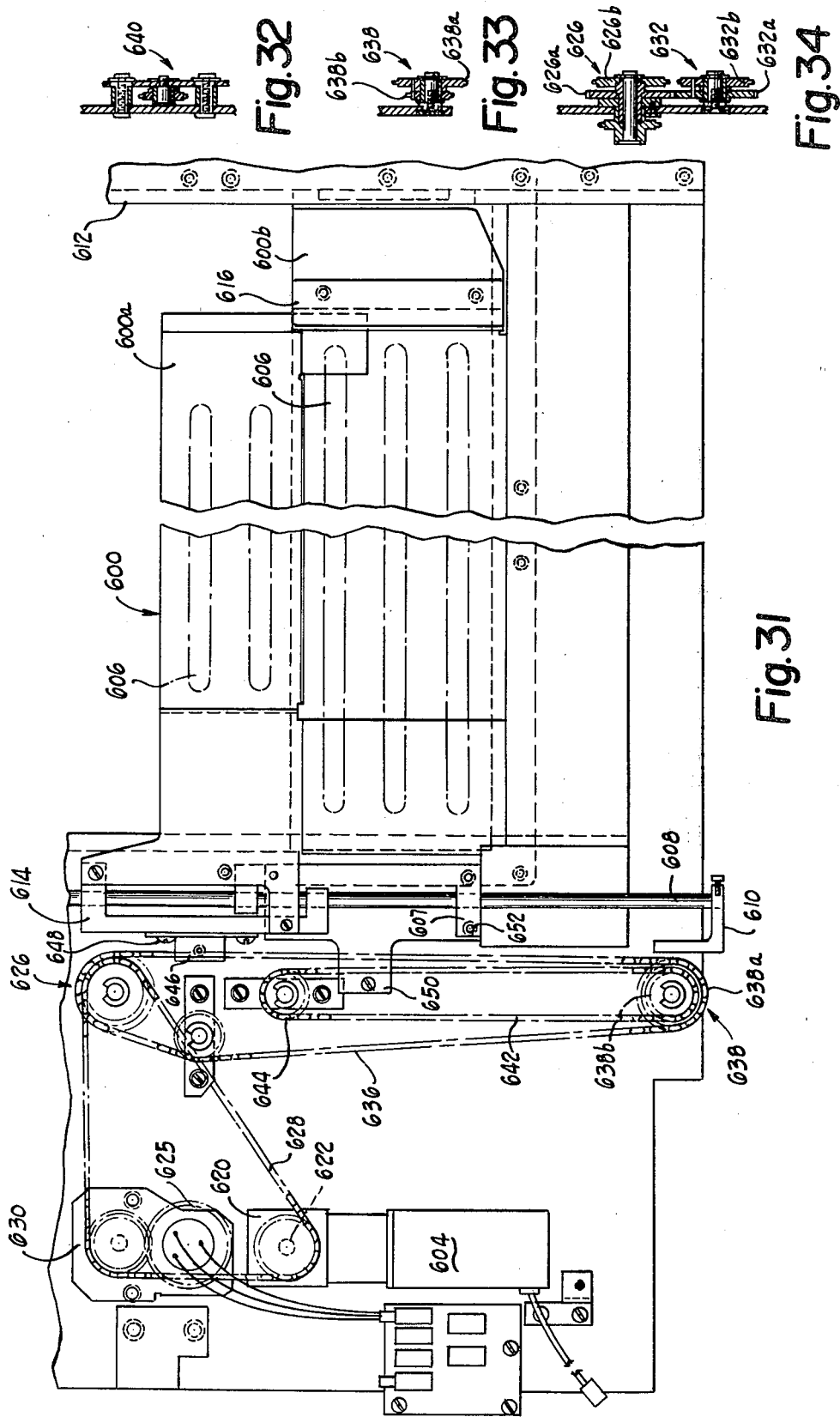

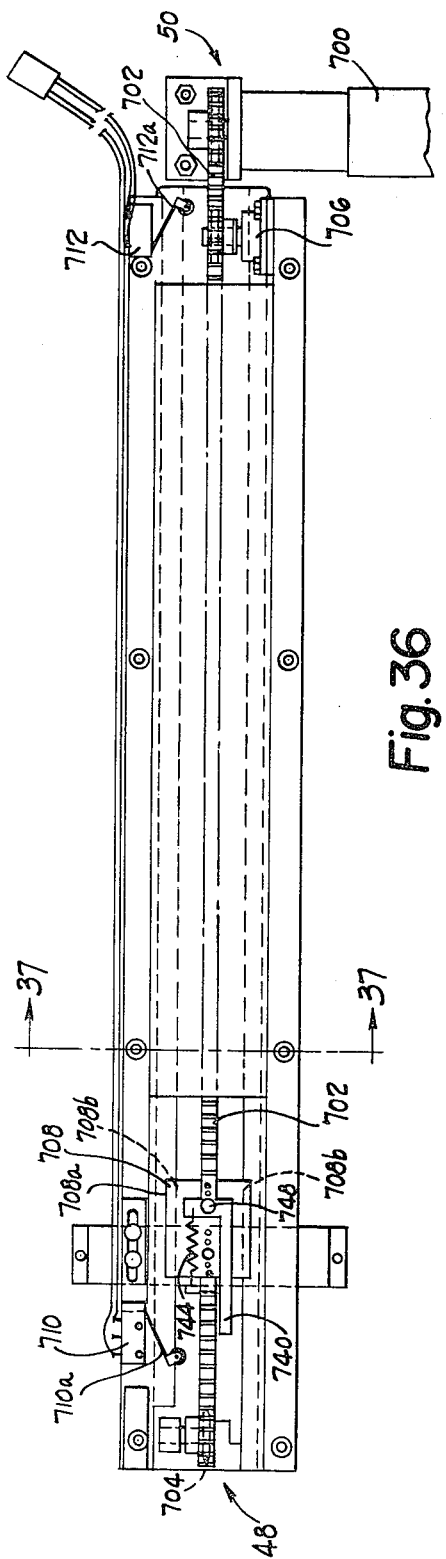
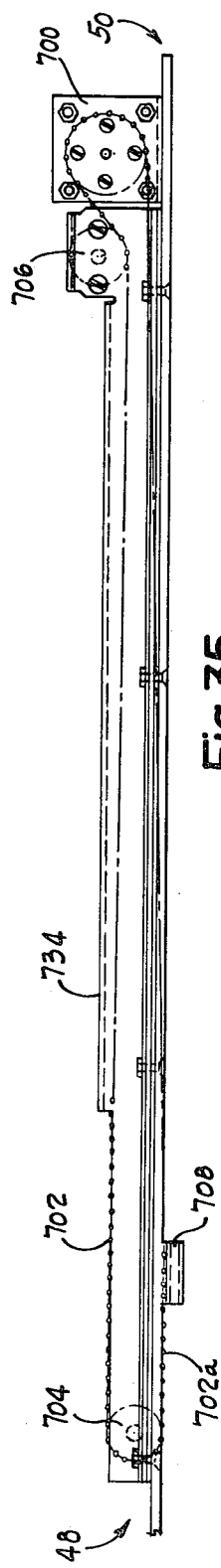
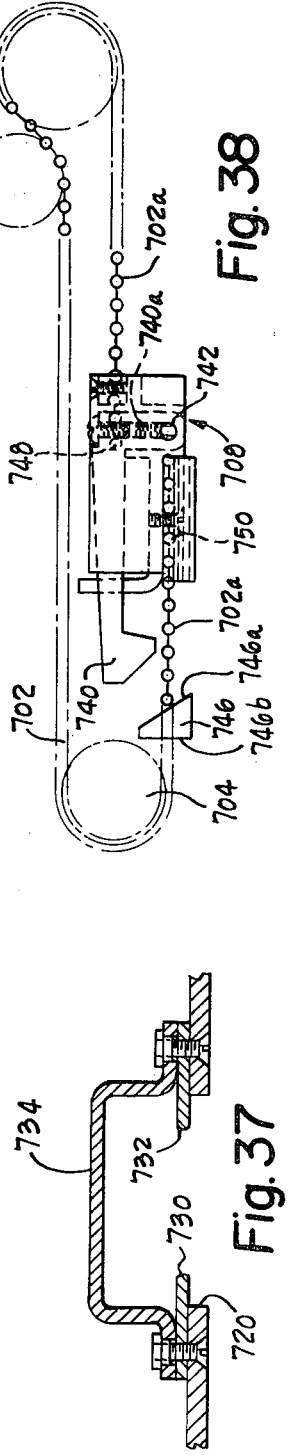
Fig. 36
Fig. 35
Fig. 38
Fig. 37

SPOTFILMING APPARATUS

DESCRIPTION

1. Technical Field

The present invention relates generally to diagnostic X-ray apparatus and in particular to a new and improved spot filming device and operating method.

2. Background Art

An X-ray spotfilmer is one of the more important radiographic tools used by the medical profession today. Generally, a spotfilmer forms part of a X-ray table and is used to examine selected regions of on a patient. The spotfilmer is commonly supported above a patient examining surface defined by the X-ray table and is supported for longitudinal movement along the table by a tower movably connected to the table. An X-ray source is enclosed by the table and coupled to the tower so that the alignment between the X-ray source and the spotfilmer is maintained in any position along the patient examining surface. In use, the X-ray source emits penetrative radiation that passes through the patient and strikes radiation input plane normally defined on the bottom of the spotfilmer housing. The impinging radiation is then converted by the spotfilmer to either a fluoroscopic image or a radiograph depending on the mode selected by the radiologist.

Prior art spotfilmers generally include a carriage assembly movably supported within the housing which serves as a means for supporting and conveying an X-ray film cassette to one of a plurality of positions within the housing. An example of one such spotfilmer can be found in U.S. Pat. No. 3,173,008 which issued to Barrett et al and which is owned by the present assignee. As noted above, spotfilmers are operated in either a fluoroscopic or radiographic mode. In the fluoroscopic mode, the housing is positioned over the patient and the X-ray source is energized. The X-rays penetrate the patient and impinge upon a fluoroscopic screen mounted in the housing or more typically with modern equipment, strike an image intensifier tube mounted on the top of the spotfilmer housing in alignment with the X-ray source. The image intensifier tube is coupled to a CRT display and translates the impinging X-ray pattern into a video image. If the radiologist desires a radiograph of the area being examined, a radiographic mode is selected. In this mode, a film cassette is positioned within the housing in alignment with the patient area being examined. The X-ray source is then energized to expose the X-ray film.

In the spotfilmer disclosed by Barrett, the film cassette is supported within the housing by a reciprocating carriage assembly which is movable between retracted and exposure positions. A cross carriage is supported by the carriage assembly and is operative to reciprocally move a film cassette in a direction substantially transverse to the motion of the carriage assembly. The combination of motion provided by the carriage assembly and the cross carriage allowed selected portions of a film cassette to be positioned in alignment with the X-ray source and thus a plurality of exposures can be sequentially placed on a single film cassette. In the Barrett device, one, two or four exposures on a single sheet of film could be selected.

Between exposures and during the fluoroscopic mode, the carriage assembly was driven to a retracted position, that is a position outside of the radiographic field, thereby allowing the X-rays to impinge directly upon the image intensifying tube (or alternately a fluoroscopic screen).

The Barrett and the other prior art devices, were generally designed to accept cassettes of one or more predetermined sizes. When multiple images are to be exposed on the cassette, the size of the cassette determines the alignment position of the carriage assembly during exposure. For example, the carriage must assume a different position during exposure for an 8×10 cassette than it does for a 10×10 cassette when a given exposure sequence is selected. As a consequence, prior art filmers only accept cassettes of a predetermined number of sizes. For example, prior art filmers could not accept both American sized and metric sized cassettes. In addition, the prior art filmers that accepted multiple cassette sizes, the size of the cassette may be sensed by the spotfilmer or alternately the operator must actuate a size selector control forming part of the spotfilmer. In either event, the spotfilmer would only accept discrete cassette sizes.

In order to delineate the imaging area and avoid "fogging" or exposing the entire cassette when multiple exposures are to be made, a spotfilmer generally includes a series of masks which are disposed intermediate the X-ray source and the cassette film plane. In most filmers, the masks comprise rectangular plates constructed of lead or other X-ray absorptive material that include rectangular openings through which the X-ray beam is allowed to pass and hence define the radiographic film area. A plurality of masks having differently sized openings are usually provided to accommodate various filming formats and cassette sizes. Generally, it is desirable to optimize the film area used on a cassette due to the high cost of photographic film today. However, it is equally important to avoid the fogging of adjacent image areas which is excessive, render the radiograph useless. In order to achieve these goals, the shape and size of the mash opening should coincice with the shape and size of the X-ray beam as defined by an X-ray collimator. For this reason each filming format and film cassette size requires a distinct mask opening. Consequently, the number of film formats and cassette sizes that can be accommodated in prior spotfilmers is limited because, due to space constraints, only a limited number of fixed size masks can be mounted within a spotfilmer housing.

Many commercially available spotfilmers include a palpitator cone mounted to the underside of the spotfilmer housing. In general, the cone is movable by the operator between retracted and operative positions. In some spotfilmers, the cone is power driven between these positions and requires only that the operator actuate a suitable control located on the control panel. A problem present in prior filmers is movement in the palpitator cone from its operative position when the cone is in contact with the patient and the radiologist attempts to translate the filmer housing. This unexpected, unchecked movement in the cone can be time wasteful because it requires a radiologist or technician to reposition the patient, the cone assembly or the spotfilmer before continuing with the examination.

DISCLOSURE OF THE INVENTION

The present invention provides a new and improved masking apparatus and palpitator cone drive for use with an x-ray spotfilming device. The disclosed masking apparatus is substantially infinitely variable and can define a plurality of mask openings between a minimum and maximum limit. The disclosed palpitator cone drive system is operative to move a palpitator cone between retracted and operative positions and includes a locking apparatus for preventing movement in the palpitator cone when the cone is in its operative position.

In a preferred embodiment, the masking apparatus comprises first and second pairs of shutter-like members constructed of X-ray absorptive material, such as lead, that are slidably supported within a spotfilmer housing intermediate an x-ray source and a film plane defined by a cassette conveying and clamping apparatus. The first pair of members are guided for movement in a first direction in a plane of motion transverse to the path of an x-ray beam. The second pair of members is oriented for movement in a mutually orthogonal direction with respect to the direction of motion of the first pair. The members of a pair are concurrently driven towards or away from each other by a drive system associated with each pair.

According to this feature of the invention, each drive system preferably includes a servomotor and feedback potentiometer that are interfaced to a suitable control system. The potentiometer monitors the position of the mask members and enables the control system to drive the members to predetermined positions within the x-ray field thereby defining a predetermined mask opening.

According to another feature of the invention, each member of the second pair comprises relatively movable first and second elements that operate in a telescope-like manner. Specifically, the elements of a member are guided for motion in spaced, parallel planes so that when the member is driven to a retracted position, the elements overlie each other and when the member is extended, the elements are located adjacent each other in a side by side relationship, with some overlap. This mask construction substantially reduces the space required to accommodate the distance travelled by each mask member and does not substantially increase the transverse dimension of the spotfilmer housing.

In accordance with this feature, the first and second elements of each mask member are actuated at differing linear speeds so that both elements will reach their retracted or extended positions simultaneously. To accomplish this feature, a drive system is provided which comprises first and second drive belts operatively connected to the first and second elements which are driven at first and second speeds. In the preferred embodiment, the speed differential is accomplished using a single servomotor that drives a compound pulley assembly that includes concentric drive pulleys having first and second diameters. The concentric drive pulleys in turn drive the first and second drive belts. It should be appreciated, that the ratio of the drive belt speeds is proportional to the ratio of the diameters of the first and second pulleys. Those skilled in the art will recognize that by appropriate selection of the pulley diameters, the ratio between the actuating speeds of the first and second elements of each member can be appropriately adjusted.

According to another feature of the invention, a palpitator drive cone system is provided that automatically locks the position of the palpitator cone whenever it is driven to its operative position. In the preferred embodiment, a palpitator cone mounted for movement between retracted and operative positions along a bottom surface of the spotfilmer housing and is operatively connected to a cone drive assembly. The drive assembly is driven between cone-advanced and cone-retracted positions by a power drive system comprising a reversible motor and a drive train that includes a drive belt, preferably a drive chain. In accordance with this feature, a cone lock forming part of the drive system is released whenever the drive motor is energized in the cone retracting direction.

In the preferred embodiment, the cone lock comprises a latch pivotally mounted to the cone drive assembly that engages a keeper when the drive assembly is driven to the cone-advanced position. The latch is biased towards its locking position so that it automatically engages the keeper whenever the drive assembly is driven to the cone advanced position.

The latch is released whenever the drive motor is energized to retract the palpitator cone. To accomplish this feature, the drive chain is fastened to the latch, the attachment point being located a distance from the pivotal axis of the latch, thereby defining a moment arm. When the drive motor is initially energized to return the palpitator cone, the retracting force applied to the drive chain operates to pivot the latch thereby disengaging the keeper. Once the latch moves to its released position, the retracting force is applied to the drive assembly via the latch pivot and operates to retract the drive assembly thereby driving the palpitator cone to its retracted position.

In the preferred embodiment, limit switches are provided that are actuatable by the drive assembly and operate in conjunction with a drive motor control circuit to define the limits of travel of the drive assembly. The drive assembly is mounted for sliding movement in a trackway formed at least partially by a slot disposed in a spotfilmer support plate along the bottom of the spotfilmer.

The disclosed palpitator cone lock and drive system effectively restrains the palpitator cone from unexpected or uncontrolled movement during a radiographic examination. This feature is accomplished without the necessity of separately actuated cone locks or locking hardware. The lock is automatically released whenever the drive system is energized in the cone-retracting direction and is effected by the cone retracting force generated by the cone drive system and applied through one end of the cone drive chain.

Other features and a fuller understanding of the invention will be obtained in reading the following detailed description made in connection with the accompanying drawings.

BRIEF DESCRIPTION OF THE DRAWINGS

FIG. 7 is a top plan view of the carriage assembly, rotated 90° from the position shown in FIG. 5;

FIG. 8 is a side elevational view of the carriage assembly as seen from the plane indicated by the line 8—8 in FIG. 7, with portions removed to show detail;

FIG. 9 is a side elevational view of the spotfilmer housing as seen from the plane indicated by the line 9—9 in FIG. 5, with portions removed to show interior detail;

FIG. 10 is a cross-sectional view of the filmer housing as seen from the plane indicated by the line 10—10 in FIG. 5;

FIG. 13 is an enlarged, sectional view as seen from the plane indicated by the line 13—13 in FIG. 11;

FIG. 14 is a rear elevational view of the carriage assembly and includes a fragmentary sectional view of a portion of the spotfilmer housing;

FIG. 15 is an enlarged, fragmentary view of a portion of the carriage assembly with certain portions shown diagrammatically;

FIG. 16 is a fragmentary, sectional view as seen from the plane indicated by the line 16—16 in FIG. 15;

FIG. 20 is a top plan view of a front load support plate constructed in accordance with the preferred embodiment of the invention;

FIG. 21 is a side elevational view as seen from the plane indicated by the line 21—21 in FIG. 20; FIG. 22 is a top elevational view of a clamp member, with portions broken away to show interior features;

FIG. 23 is a side view of the clamp member as seen from the plane indicated by the line 23—23 in FIG. 22;

FIG. 24 is a top elevational view of a support plate illustrating the mounting of an X-ray grid assembly and a portion of a film cassette advancing apparatus;

FIG. 26 is a side elevational view as seen from the plane indicated by the line 26—26 in FIG. 24, with portions broken away to show additional features;

FIG. 29 is a top plan view showing the construction of a "Y" mask assembly constructed in accordance with the preferred embodiment;

FIG. 30 is an enlarged side elevational view as seen from the plane indicated by the line 30—30 in FIG. 29;

FIG. 31 is an enlarged, fragmentary view of the "Y" mask assembly;

FIG. 32 is a fragmentary, sectional view as seen from the plane indicated by the line 32—32 in FIG. 29;

FIG. 33 is an enlarged, sectional view as seen from the plane indicated by the line 33—33 in FIG. 29;

FIG. 34 is an enlarged, sectional view as seen from the line 34—34 in FIG. 29.

FIG. 35 is an enlarged, side elevational view of a cone drive system as seen from the plane indicated by the line 30—30 in FIG. 29;

FIG. 36 is a top fragmentary view of a portion of the assembly as seen from the plane indicated by the line 36—36 in FIG. 35;

FIG. 37 is a sectional view as seen from the plane indicated by the line 37—37 in FIG. 36; and, FIG. 38 is a diagrammatic view of a portion of the cone drive system.

BEST MODE FOR CARRYING OUT THE INVENTION

Figure 1:
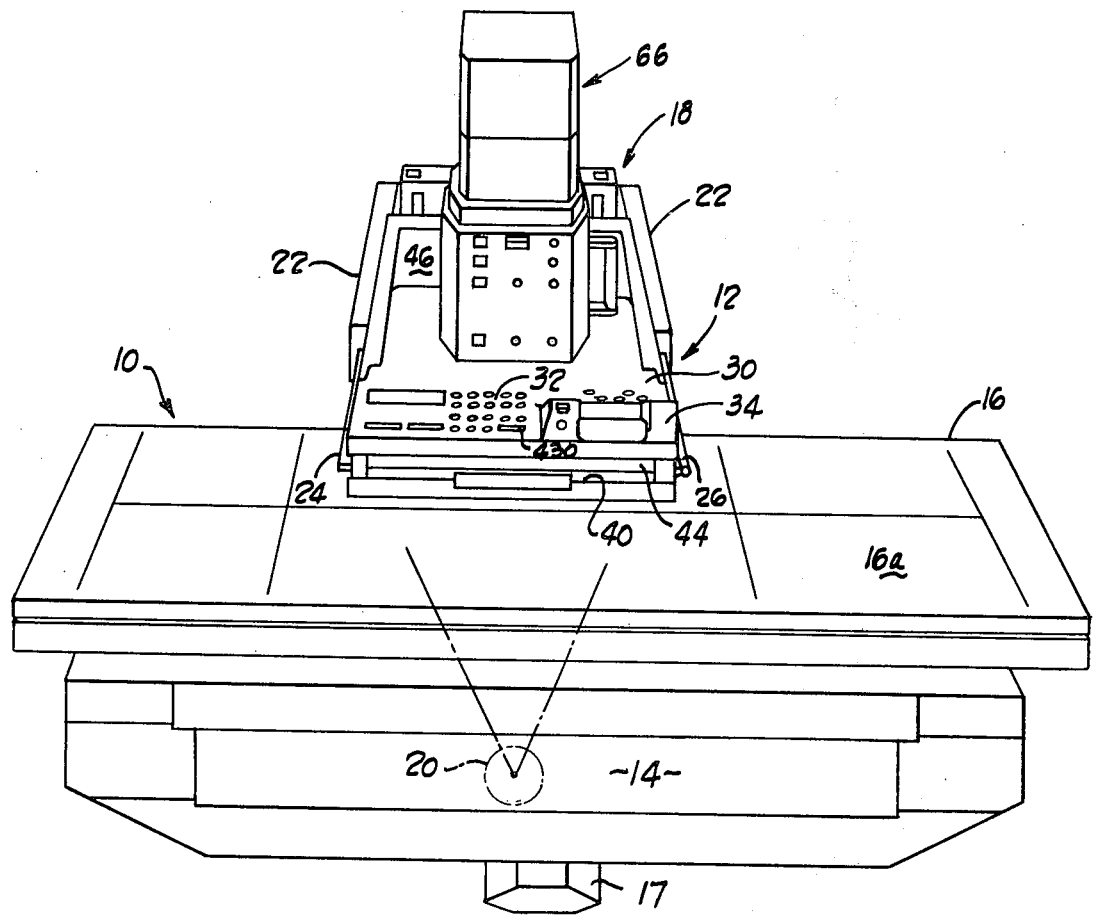
FIG. 1 is a perspective view of an X-ray apparatus that includes a spot filmer constructed in accordance with the preferred embodiment of the invention.

FIG. 1 illustrates the overall construction of a medical X-ray apparatus that includes an X-ray table 10 and a spotfilmer 12 constructed in accordance with a preferred embodiment of the invention. The X-ray table 10 includes a table body 14 and a movable table top 16 that defines a planar patient examining surface 16a. The table body 14 is rotatably supported by a pedestal, a portion of which is indicated by the reference character 17 and is rotatable about an axis defined by the pedestal 17 between horizontal and vertical positions. The table top 16 is supported for longitudinal and transverse movement with respect to the table body 14 in a conventional way.

The spotfilmer 12 is supported above the patient examining surface 16a by a vertical tower 19. The tower is supported for movement along the table body 14 by a tower support carriage (not shown). A conventional X-ray source 20 (indicated schematically) comprising an X-ray tube and collimator (not shown) is located within the table body 14 and is mounted to the tower carriage. The X-ray source 20, tower 18 and the spotfilmer 12 move as a unit and thus the alignment between the spotfilmer 12 and the X-ray source 20 is maintained regardless of spotfilmer position.

The spotfilmer 12 is attached to the tower 18 by a support frame that includes a pair of transversely extending arms 22. The arms 22 are vertically movable (as viewed in FIG. 1) with respect to the tower 18 and provide a means for adjusting the height of the spotfilmer above the patient examining surface 16a. The spotfilmer 12 is slidably attached to the arms 22 by support rails 24, 26 that extend along the sides of the spotfilmer. In the preferred embodiment, the rail 24 is rectangular in cross-section and is slidably engaged and vertically supported by a longitudinal slot (not shown) formed in the left arm 22. The rail 26 is circular in cross section and is both vertically and laterally supported by a complementary shaped slot (not shown) formed in the right arm 22.

When the support arms 22 are raised to their uppermost position so that the bottom surface of the filmer is above the top end of the tower 18, the spot filmer 12 is slidable between a non-operated position wherein the spotfilmer is positioned to the rear of the X-ray table 10 and an operative position wherein the spotfilmer 12 overhangs the patient examining surface 16a (as seen in FIG. 1).

Figure 2:
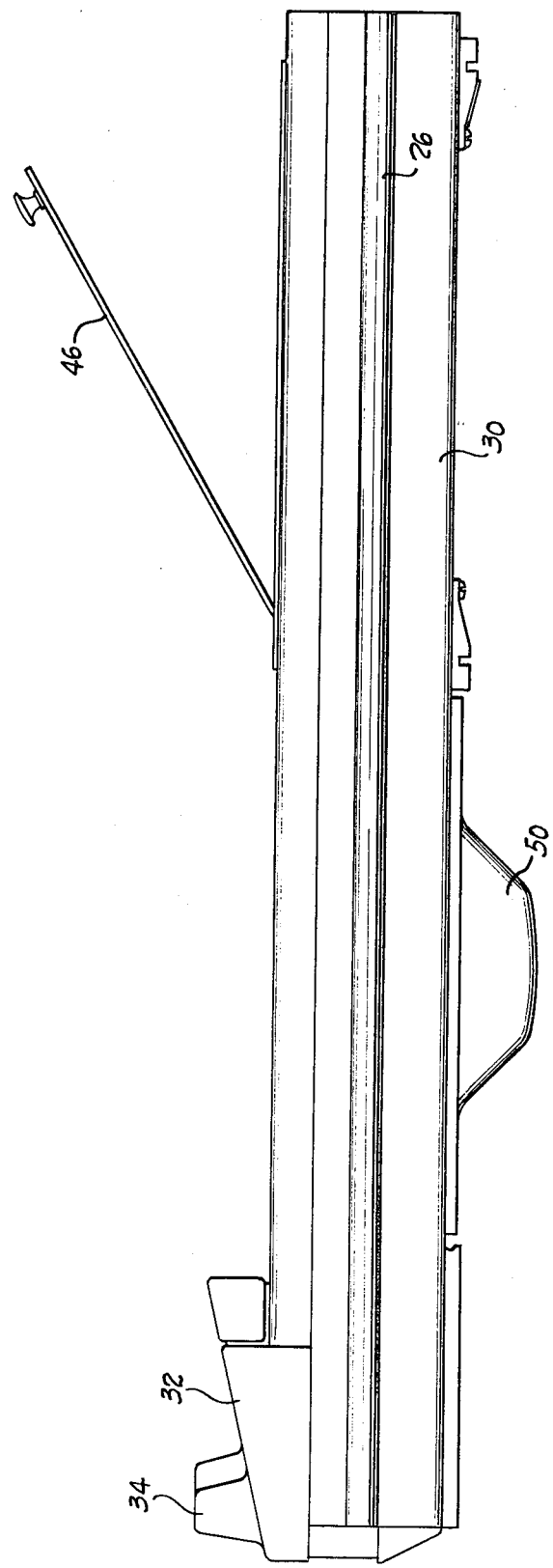
FIG. 2 is a side elevational view of the spot filmer shown in FIG. 1 with parts removed for clarity.

Referring also to FIG. 2, the spotfilmer includes a metal exterior housing 30 that forms at least a portion of the supporting frame structure for the spotfilmer. A molded operator control and display panel 32 is mounted across the front of the spotfilmer and includes an integrally formed operating handle 34 that projects upwardly from the top surface of the panel 32. The handle 34 is grasped by the radiologist to manually move the spotfilmer 12 in the longitudinal, vertical and transverse directions with respect to the table 14 and alternately may include one or more sensors for activating a power drive system to facilitate the positioning of the spot filmer by the radiologist.

Figure 3:
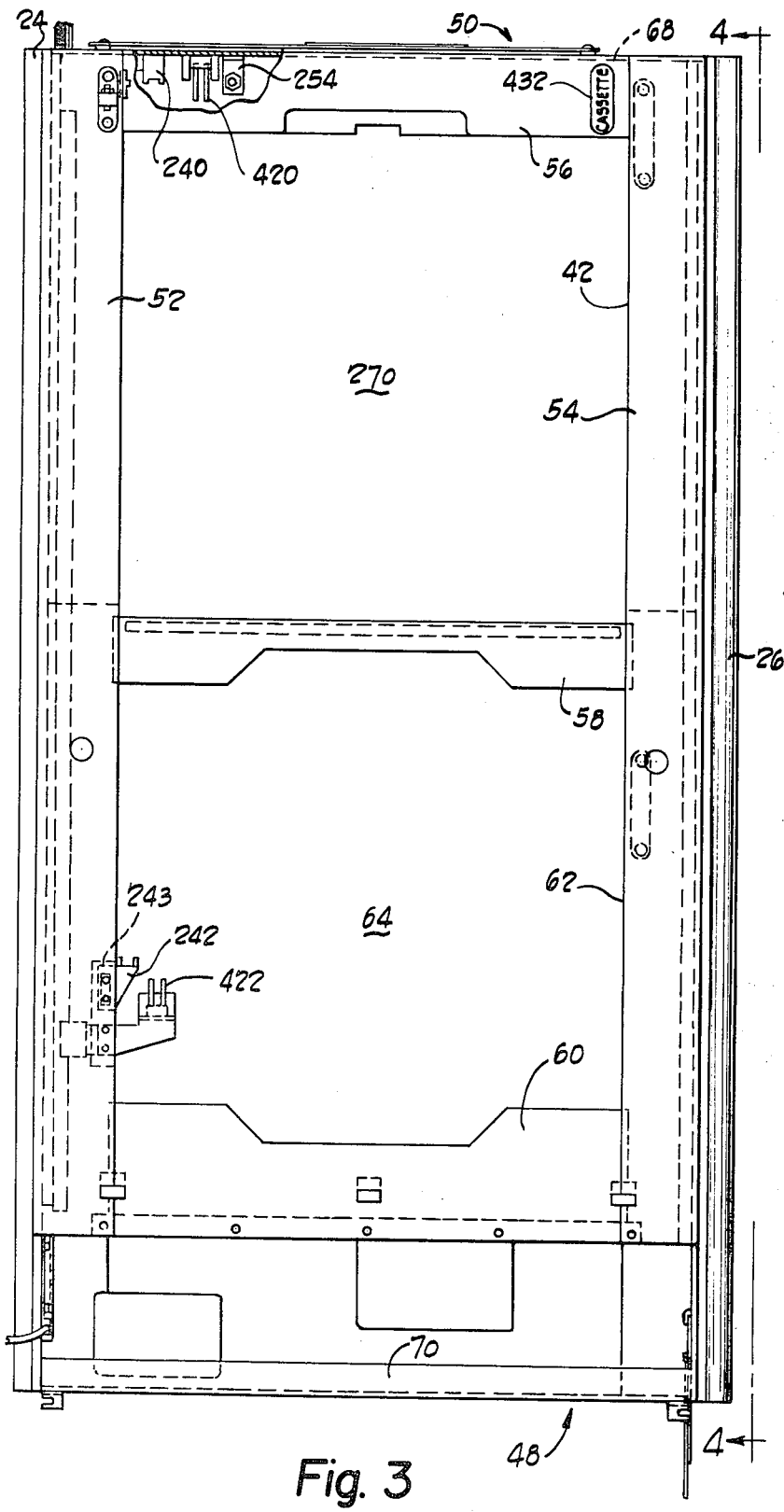
FIG. 3 is a top plan view of the spot filmer housing.

Film cassette receiving openings 40, 42 are defined by the spotfilmer housing 30 (the rear opening 42 is shown in FIG. 3). An access door 44 (shown best in FIG. 21) is pivotably mounted within the opening and automatically opens and closes before and after a film cassette is loaded, respectively. A rear access door 46 (shown in FIG. 2) normally covers the cassette receiving opening 42, allowing access to the interior of the spotfilmer housing 30 only when a rear load mode has been selected by the operator. A suitable interlock system can be used to control the opening of both the front and rear doors 44, 46.

A conventional palpitator cone 50 is slidably mounted to the bottom of the filmer housing 30. A drive system is operative to drive the cone between operative and retracted positions.

To facilitate the description, the front and rear of the spotfilmer shall be designated by the reference characters 48, 50, respectively. Additionally, the same reference characters 48, 50 will be used throughout the Figures to indicate the front-to-rear orientation of a sub assembly within the spotfilmer housing.

Figure 4:
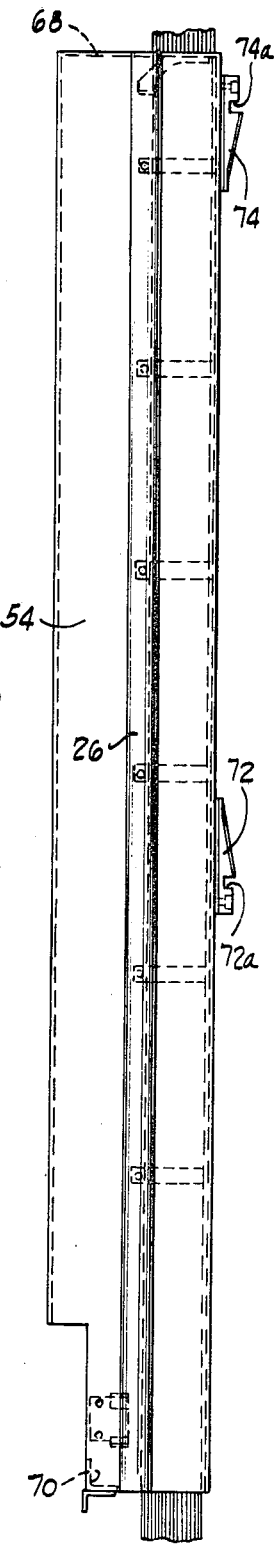
FIG. 4 is a side view of the spotfilmer housing as seen from the plane indicated by the line 4—4 in FIG. 3.
Figures 5, 6:
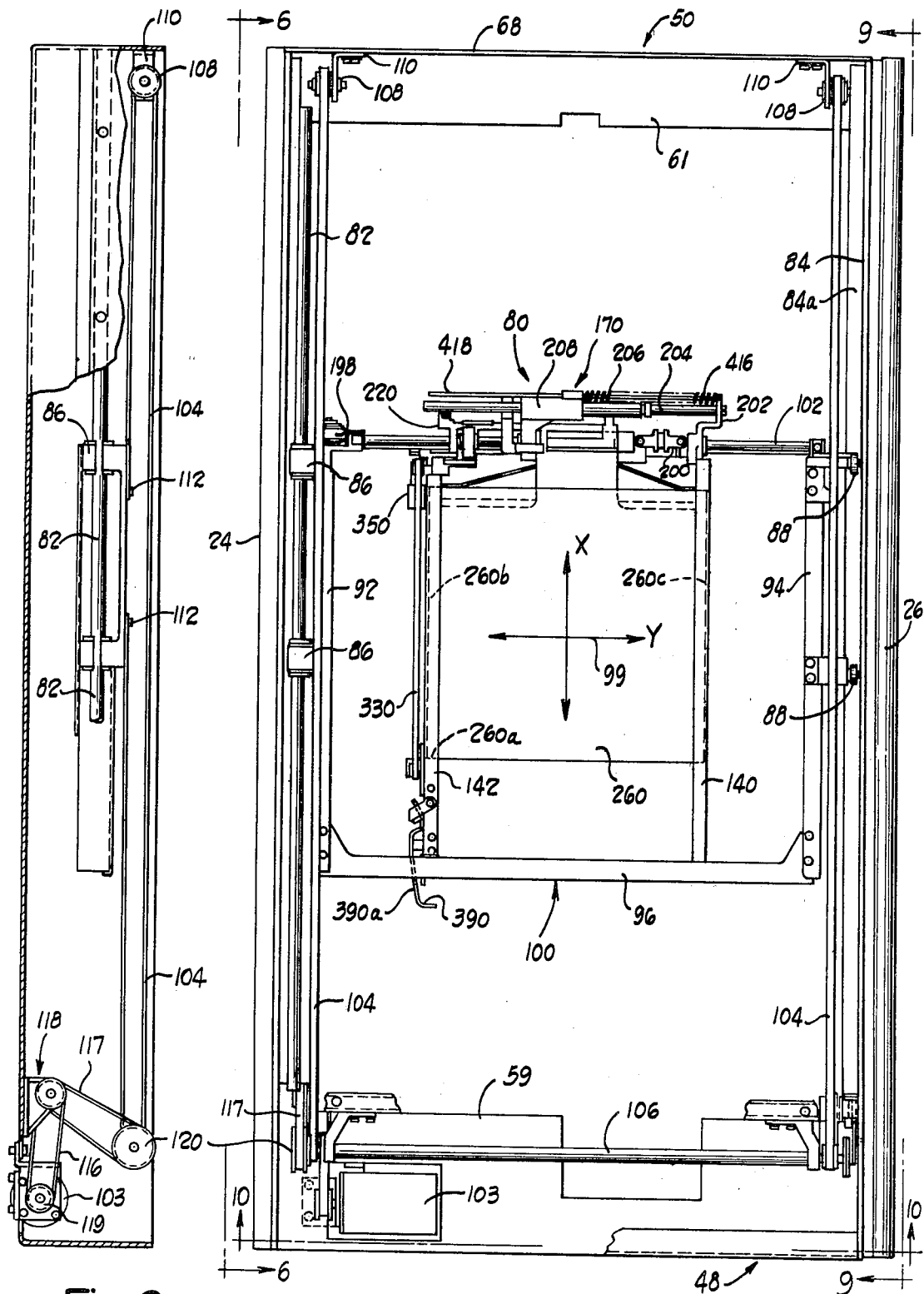
FIG. 5 is a top plan view of a carriage assembly mounted within the spotfilmer housing, constructed in accordance with the preferred embodiment of the invention.
FIG. 6 is a side view of the spotfilmer housing as seen along the plane indicated by the line 6—6 in FIG. 5, with portions removed to show interior detail.

Referring also to FIGS. 3 and 4, the spotfilmer housing 30 is preferably a weldment and includes a pair of extruded aluminum U-shaped channels 52, 54 that form side plates. Aluminum tie plates 56, 58, and 60 are butt welded between the upper legs of the U-channels 52, 54 at spaced locations along their longitudinal extent. Referring to FIG. 5, tie plates 59, 61 are butt welded between the lower legs of the U-channels 52, 54 at the front and rear of the housing, respectively.

As seen in FIG. 3, the side channels 52, 54 and the tie plates 56, 58 define the rear cassette receiving opening 42 in the spotfilmer housing 30. The channels 52, 54 together with the middle and front tie plates 58, 60 respectively define an opening 62 that is in alignment with the axis of the X-ray source when the spotfilmer 12 is in its operative position and defines an X-ray exposure field 64. In use, a fluoroscopic screen (not shown) or more typically, an image intensifying tube assembly 66 (shown in FIG. 1) is mounted over the opening 62. It will be recognized that the image intensifying tube assembly 66 is coupled to a CRT display (not shown) to provide video fluoroscopic images when the spotfilmer is used in a fluoroscopic mode.

A rear plate 68 is fastened across the back of the filmer housing 30 to provide added rigidity. An L-shaped angle member 70 is similarly fastened across the front of the filmer housing and provides the same function. The housing support rails 24, 26 are preferably constructed of steel and are suitably fastened to the respective U-channels 52, 54. As seen in FIG. 4, lock detents 72, 74 are fastened at spaced locations along the bottom of the U-channel 54 and cooperate with a plunger (not shown) preferably operated by a solenoid which is engageable with slots 72a, 74a formed in each detent thereby providing a means to lock the spotfilmer housing in either the operative or nonoperative position.

Cassette Positioning Apparatus

According to the invention, the spotfilmer housing 30 encloses and supports a film cassette clamping and positioning apparatus. Referring to FIGS. 5-8, the preferred film cassette clamping and positioning apparatus comprises a carriage assembly indicated generally by the reference character 80 in FIG. 5 and mounted in the upper region of the filmer housing 30. The carriage assembly 80 is supported for reciprocating motion in the longitudinal direction by a guide rail 82 and a trackway 84. As viewed in FIG. 5, the rail 82 extends along the left side of the filmer housing 30 and comprises an elongate rod, whereas the trackway 84 parallels the right side of the film housing and comprises an inner longitudinal slot integrally formed in the right channel 54 defining a planar roller surface 84a (see FIG. 14). A pair of linear bearings 86 available from Thompson Industries is mounted to the left side of the carriage 80 (as viewed in FIG. 5) and slidably engage the rod 82. A pair of rollers 88 is mounted to the right side of the carriage assembly and ride atop the surface 84a defined by the slot 84. It should be apparent that the rollers 88 provide vertical support for the carriage while the linear bearings 86 laterally and vertically locate the carriage assembly 80 within the housing 30.

Referring in particular to FIGS. 7 and 8, the carriage assembly 80 includes a pair of longitudinal members 92, 94 to which the linear bearings 86 and the rollers 88 are fastened, respectively, and a pair of transverse members 96, 98, which together define a rigid frame 100. A transverse guide shaft 102 is mounted across the left side of the assembly 80 (as viewed in FIG. 7), just above the transverse member 98. The frame members 92, 94, 96, 98 are preferably U-shaped in cross section and are rigidly fastened to each other.

Figures 11, 12:
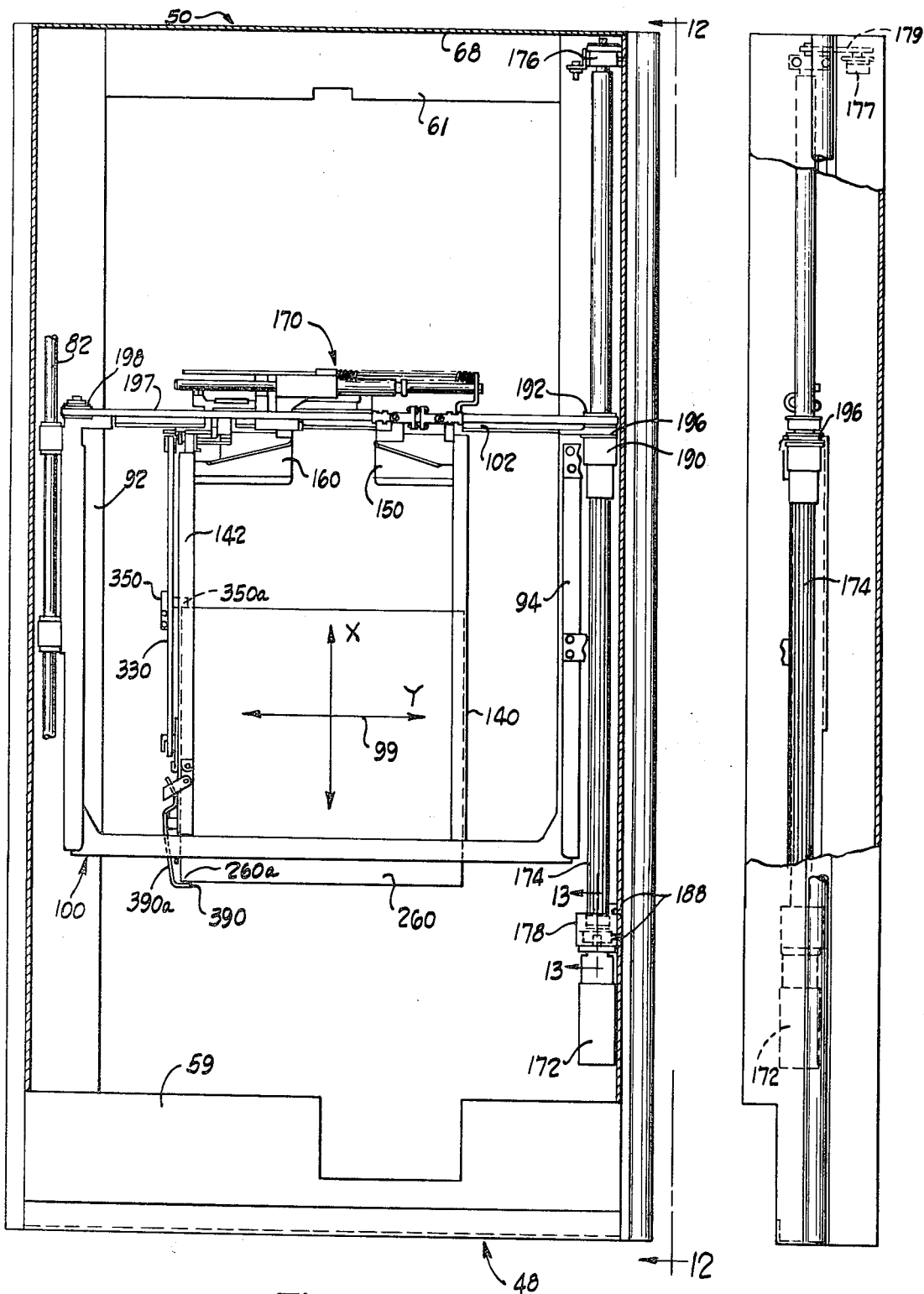
FIG. 11 is a top plan view of the interior of the filmer housing showing the drive system for a clamping arrangement constructed in accordance with the preferred embodiment of the invention.
FIG. 12 is a side view of the filmer housing as seen from the plane indicated by the line 12—12 in FIG. 11, with portions removed to show interior features.

According to the invention, the carriage assembly 80 mounts a film cassette clamping arrangement that is operative to translate a clamped cassette in a direction substantially transverse to the direction of motion of the carriage assembly. In the preferred embodiment, a power drive system, preferably including separate drive motors, drives the carriage assembly 80 and the clamping arrangement in the longitudinal and transverse directions, respectively. For purposes of explanation, the motion of the carriage assembly 80 in a longitudinal direction shall be termed the "X" direction and the motion of the clamping arrangement in the orthogonal direction shall be termed the "Y" direction, as indicated in FIG. 5. Arrows 99 in FIGS. 5, 7 and 11 illustrate the mutually orthogonal directions of motion of the carriage assembly 80 (x-direction) and the clamping arrangement (y-direction).

Referring also to FIGS. 9 and 10, the carriage assembly 80 is reciprocably driven in the longitudinal or "X" direction by an "X" drive system. The "X" drive comprises a reversible motor 103 preferably a servo motor, mounted near the front end 48 of the filmer housing 30, and a pair of drive belts 104, driven by a common drive shaft 106. The drive belts 104 are preferably toothed belts that run between the drive shaft 106 and idler pulleys 108 rotatably mounted by L-shaped brackets 110 attached to the rear plate 68 of the filmer housing 30. As seen in FIG. 6, the ends of the left drive belt 104 are fastened to the left side of the carriage assembly 80 by fasteners 112. The right drive belt 104 is attached to the right side of the carriage assembly by a fastener 114 (shown in FIG. 10).

The motor 103 drives the common shaft 106 through an intermediate pulley arrangement shown best in FIG. 6, that includes a pair of drive belts 116, 117 and a transfer pulley 118 that interconnects the drive belts timing chains 116, 117 from an output pulley 119 mounted to the motor 102 and an outboard mounted pulley 120 mounted to the left end of the drive shaft 106 (as viewed in FIG. 5).

Referring in particular to FIGS. 9 and 10, the right end of the drive shaft 106 mounts an output pulley 122 that drives a potentiometer 124 through a pair of drive belts 126, 128 and an intermediate transfer pulley 130. It should be apparent that the resistance of the potentiometer 124 will be a function of the position of carriage assembly 80 within the housing 30 and thus the potentiometer 124 is used to monitor the "X" position of the carriage assembly 80 in the spotfilmer housing.

Returning to FIGS. 7 and 8, the cassette clamping arrangement comprises a pair of clamp members 140, 142 slidably supported for movement in the "Y" direction by the carriage frame member 96 and the transverse guide rod 102. The clamp member 140 is partially formed by a U-channel 140a that spans the distance between the frame member 96 and the shaft 102. The left end of the member 140 is supported and guided for movement on the top surface of the lower leg 96a of the U-shaped frame member 96. A guide plate 144 is attached to the end of the member 140 by fasteners 146 and in turn mounts a guide button 148 made of a low friction material, such as nylon which rides atop the surface 96a. Shims 149 are inserted between the guide plate 144 and the underside of the top leg of the U-channel 140a to adjust the height of the left end of the clamp member 140 with respect to the frame member 96.

A horizontal cassette support plate 150 having a beveled surface 150a is fastened to and extends transversely from the lower leg of the U-channel section 140a. A triangular shaped plate 152 is attached to the upper leg of the U-channel section 140a and overlies a portion of the plate 150. An angled guide block 154 formed from a low friction material such as nylon is captured between the lower and upper plates 150, 152. During clamping of a cassette, the guide block 154 urges a film cassette towards the left as viewed in FIG. 7.

The right end of the clamp member 140 also mounts a pair of bushings 156, (shown best in FIG. 15) preferably linear bearings similar to the bearings 86, which slidably engage the transverse guide shaft 102. In the preferred embodiment, the plates 150, 152 and bearing mounts 157 (shown in FIG. 15) are part of a unitary casting which is welded to the U-channel section 142a.

The clamp member 142 is similar in construction to the member 140. It comprises: a U-channel section 142a; a guide plate 156 on its left end that mounts a guide button 158; a horizontal cassette support plate 160 welded to the lower leg of the U-channel 142a; an upper plate 162 attached to the upper leg and a cassette guide block 164 captured between the plates 160, 162. A pair of linear bearings 166 mounted to the right end of the member 142 (as viewed in FIG. 7) slidably engage the guide shaft 102. A tension spring 168 extends between the left ends of the clamp members 140, 142 and urges them toward each other. It should be clear that the guide buttons 148, 158 and the bearings 156, 166 provide a low friction mounting for the clamp members 140, 142, thereby facilitating the movement of the clamp members 140, 142 within the carriage 80.

According to the invention, the clamp members 140, 142 include a clamp interlocking mechanism, indicated generally by the reference character 170, that selectively couples and decouples the clamp members. When engaged, the lock 170 causes the members 140, 142 to move as a unit. When the interlocking mechanism 120 is disengaged, the clamp members 140, 142 are permitted to move relative to each other.

The clamp members 140, 142 are power driven to various positions within the carriage assembly 80 by a drive system which is best seen in FIGS. 11 and 12. The drive system comprises a reversible motor 172, preferably a servo motor that is coupled to a rotatable spline shaft 174 that extends along the right side of the filmer housing and is rotatably supported by a pair of bearing assemblies 176, 178. The axis of the spline shaft 174 parallels the axis of the guide rod 82. A feedback potentiometer 177 (see FIG. 12) is operatively driven by the spline shaft 174 through a drive belt 179 that extends between a drive sprocket mounted at the end of the shaft 174 and a sprocket fastened to the potentiometer 177.

Preferably the motor 172 is connected to the spline shaft 174 through a rigid coupling, illustrated in FIG. 13, that forms part of the bearing assembly 178. It includes a rigid coupling member 180 that concurrently engages pins 181a, 181b extending from the output shaft 182 of the drive motor 172 and the narrow diameter portion 184 of the splined shaft 174. A bearing assembly casing 186 surrounds the rigid coupling and in turn is fastened to the inside of the right U-channel 54, by suitable fasteners 188 (shown in FIG. 11).

A bearing assembly 190 that rotatably supports a pulley 192 is slidable along the spline shaft 174. A yoke 194 (shown best in FIG. 14) extends to the right from the top right corner of the carriage frame 100 (as viewed in FIG. 11) and engages a concentric groove 196 formed in the bearing assembly 190, thereby coupling the motion of the carriage assembly 80 to the bearing assembly 190. The bearing assembly 190 and the carriage assembly 80 thus move as a unit in the "X" direction.

A drive belt 197, preferably a toothed belt, is driven by the pulley 192 and is reeved around an idler pulley 198 that is rotatably mounted at the left rear corner of the carriage frame 100 (as viewed in FIG. 11). Referring also to FIG. 14, the drive belt 197 is fixed to the clamp member 140 by a bifurcated bracket 200 that also is used to adjust the tension of the drive belt 197. The bracket 200 includes separate portions 200a, 200b that are connected by adjustable fasteners 201. The portions 200a, 200b are drawn together by the fasteners to increase belt tension. Fasteners 203 attach the bracket 200 to the clamp member 140.

The "Y" position of the clamp member 140 within the carriage assembly 80 is adjusted by the selective actuation of the "Y" servo motor 172, both right and left. Specifically, rotation of the "Y" servo motor 172 imparts attendant rotation in the spline shaft 174 which in turn drives the toothed belt 197 to cause translational motion in the clamp member 140 in the "Y" direction, regardless of the "X" position of the carriage assembly 80. The "Y" position of the clamp member 140 is monitored by the feedback potentiometer 177.

The clamp member interlocking mechanism 170 controls movement in the clamp member 142 with respect to the clamp member 140. With the mechanism engaged, the clamp member 142 is "locked" to the clamp member 140 and both members 140, 142 will be driven concurrently when the servo motor 172 is energized. In this mode, the clamp members 140, 142 will move as a unitary clamp and in effect, translate a clamped cassette in the "Y" direction, within the carriage 80. When the mechanism 170 is released, the clamp member 140 is free to move independently of the clamp member 142 and it will move towards or away from the clamp members 142 when the drive motor is energized depending on the direction of rotation.

The construction of the clamp locking mechanism 170 is detailed in FIGS. 15 and 16. As seen in FIG. 15, an L-shaped bracket 202 extends from the right end of the clamp member 140 and mounts an elongate rod 204 that extends towards the clamp member 142, its axis located parallel to the direction of motion of the clamp members 140, 142, i.e. the "Y" direction. The clamp member 142, in turn, mounts a rod engaging mechanism 206 by means of a bracket 208 that includes a cylindrical throughbore 210. In the preferred embodiment, the bracket 208 forms part of a casting that also includes the plates 150, 152 and the bearing mounts 157. The cylindrical bore 210 in the mounting bracket 208 is located coaxially with the shaft 204 and coaxially mounts the rod engaging lock 206 by means of fasteners, such as Allen screws, located at the locations indicated by the reference character 214 which engage grooves 216 formed in the body of the lock 206. The lock 206 is commercially available from Porter & Co. and includes an operating lever 218 for controlling the gripping force applied to the rod 204 by the lock 206. When the lever 218 is depressed, the lock 206 releases the rod 204; when the operating lever 218 is released, the lock 206 engages and fixes the position of the rod 204 with respect to the lock 206 and thus determines the relative positions of the clamp members 140, 142. The lever 218 is internally biased towards the rod engaging position.

Actuation of the lock 206 is achieved by a control lever 220 that is pivotally mounted to the transverse guide shaft 102. Coaxially aligned, shaft receiving apertures 222 are machined into spaced tabs 224 integrally formed in the lever 220. The tabs 224 abut the outer side surfaces of the clamp member support bearings 166 and thus the control lever 220 moves with the clamp member 142. The control lever 220 includes a pair of arms 220a, 220b that extend above and below the axis of the shaft 102. As seen more clearly in FIG. 16, a roller 226 is rotatably pinned near the tip of each arm 220a, 220b. A lock actuating arm 220c extends from the control arm 220b in a direction parallel to the shaft 102. A roller 228, pinned to the end of the arm 220c, provides a low friction rolling contact between the arm 220c and the lock operating lever 218. Rotation of the control lever 220 about the shaft 102 effects angular movement in the lock lever 218 between released and engaged positions.

According to the invention, the control lever 220 is operated to release the clamp lock 206 when both the carriage assembly 80 and the clamp member 142 are driven to predetermined positions within the filmer housing 30. Returning to FIG. 3, the control lever 220 is actuated whenever the clamp member 142 is located in its leftmost position within the carriage (as viewed in FIG. 3) and the carriage assembly 80 is driven to either its rearmost or frontmost position within the housing 30. To accomplish this function, a pair of detent blocks 240, 242 located at predetermined spaced positions within the spotfilmer housing. As viewed in FIG. 3, the detent block 240 is mounted in the left rear corner of the filmer housing 30, immediately adjacent the rear housing plate 68. The detent block 242 is mounted to the underside of the upper leg of the U-channel 52 by a bracket 243 and extends downwardly so that it extends below the plane of motion defined by the roller of the control arm 220a (see FIG. 16).

FIG. 15 illustrates diagrammatically, the relative lateral positions of the detent blocks 240, 242. The clamp member 142 is shown in its leftmost position it assumes within the carriage assembly. With the clamp member 142 in this position, energizing the X-drive, will drive the carriage assembly towards one of the detent blocks 240, 242 until one of the control arms 220a, 220b contacts its associated detent block. If, for example, the "X" servo motor is energized in a direction that causes movement in the carriage assembly in a direction towards the detent block 240, the carriage assembly 80 (see FIG. 3) will travel towards the rear of the filmer housing 30 until the control arm 220b abuts the detent block 240. Upon contact, further movement in the carriage assembly will cause the control lever 220 to rotate about the guide shaft 102, actuating the lock release lever 218, thereby releasing the shaft 204 attached to the clamp member 140. With the carriage assembly 80 and clamp member 142 in this position, energizing the "Y" drive will translate the clamp member 140 independently of the clamp member 142. In short, the clamp member 140 will move towards or away from the clamp member 142, depending on the direction of rotation of the "Y" servo motor 170.

According to a feature of the invention, the detent blocks 240, 242 not only provide an actuation surface for the rollers mounted to the control lever arms 220a, 220b, but also function as a means for restraining the clamp member 142 when the "Y" servo drive is energized to translate the clamp member 140. As seen in FIG. 15, each detent block 240, 242 defines a roller contact surface 240a, 242a which lies between a pair of projecting side surfaces 240b, 242b, respectively. When one of the control arms, for example, 220b is driven into its associated detent block 240, the roller will abuttably contact the contact surface 240a. The side surfaces 240b will extend along the sides of the roller and will laterally lock the position of the control arm 220a within the detect block 240 and will thus restrain the clamp member 142 against movement in the "Y" direction. The detent block 242 will operate in a similar fashion in connection with the control arm 220a.

In order to properly locate the clamp arm 142 with respect to the detent blocks 240, 242, a position sensor is provided for sensing a predetermined position of the clamp member 142. Preferably, the sensor detects when the clamp arm 142 is in the aligned relationship with the detent blocks as shown in FIG. 15. In the preferred embodiment, the sensor comprises a magnet 250 that is mounted to the clamp 142 (shown in FIGS. 8 and 14) by a suitable bracket 252 and which is detectable by a magnetic sensor 254, preferably a Hall effect sensor, mounted near the back wall 68 of the filmer housing 30, near the detent block 240 (see FIG. 3).

In operation, the x-drive is energized (servomotor 103) to drive the carriage assembly 80 to a rearward position in the filmer housing 30 at which the roller of the actuating arm 220b is spaced from the detent block 240 a predetermined distance in the x-direction so that the side surfaces 240b of the detent block 240 will not interfere with movement in the clamp arm 142. The "Y" servomotor 172 is then energized to drive the clamp members 140, 142 (which are interlocked by virtue of the engagement between the clamp lock 206 and the shaft 204) in the y-direction until the magnet 250 is sensed by the magnetic sensor 254, whereupon the y-drive is deenergized. The clamp arm 142 is then aligned with the detent blocks 240, 242 as shown in FIG. 15. The X-drive is then reenergized to drive the carriage assembly 80 to its rearmost position causing abutting engagement between the arm 220b and the detent block 240 effecting rotation of the control lever and attendant release of the shaft 204 by the clamp lock 206. If the Y-drive is subsequently energized the clamp member 140 will move towards or away from the clamp member 142. It should be apparent the clamp lock 206 reengages the shaft 204 whenever the carriage assembly 80 is not in contact with one of the detent blocks 240, 242.

The clamp arms 140, 142 are disengaged in a similar manner whenever the carriage assembly 80 is driven to a front-most position in the filmer housing. To eliminate the need for an additional clamp member position sensor in the front of the housing, the carriage assembly 80 is first driven to the rear of the filmer housing and the Y-drive energized to locate the position of the clamp member 142 with respect to the detent block 240. Once the clamp member 142 is located and positioned in alignment with the abutment block 240, the carriage assembly 80 is driven frontwardly until the upper arm 220a engages the front detent block 242.

As discussed previously in connection with FIG. 3, the top of the filmer housing 30 includes a cassette receiving opening 42 and an opening 62 that defines an X-ray exposure field 64. The X-drive is operative to reciprocally transport the carriage assembly 80 from the rear of the spotfilmer housing (the area of the housing below the cassette receiving opening 42) to one or more predetermined positions in the X-ray exposure field 64. For purposes of explanation, the area below the cassette receiving opening 42 is denoted by the reference character 270 and the position of the carriage assembly 80 below the opening shall be termed the "park" position. In general, the carriage assembly 80 will travel to the "park" position between X-ray exposures and during fluoroscopy. It should be noted, however, that the spotfilmer may be equipped with a rapid sequence control system in which case, the carriage assembly 80 will remain within the X-ray field 64 for a predetermined number of sequential exposures and then return to the park position.

Cassette Elevating Apparatus

According to an exemplary embodiment, a radiographic film cassette 260 (shown in FIGS. 5 and 11) to be exposed can be loaded from either the front or the rear of the filmer housing 30. During a cassette loading sequence, whether it be from the front or the rear of the housing, the film cassette 260 is supported a predetermined distance above the beveled surfaces 150a, 160a of the horizontal plates 150, 160 attached to the clamp members 140, 142 (see FIG. 7) to enable the members to travel beneath the film cassette.

Figure 17:
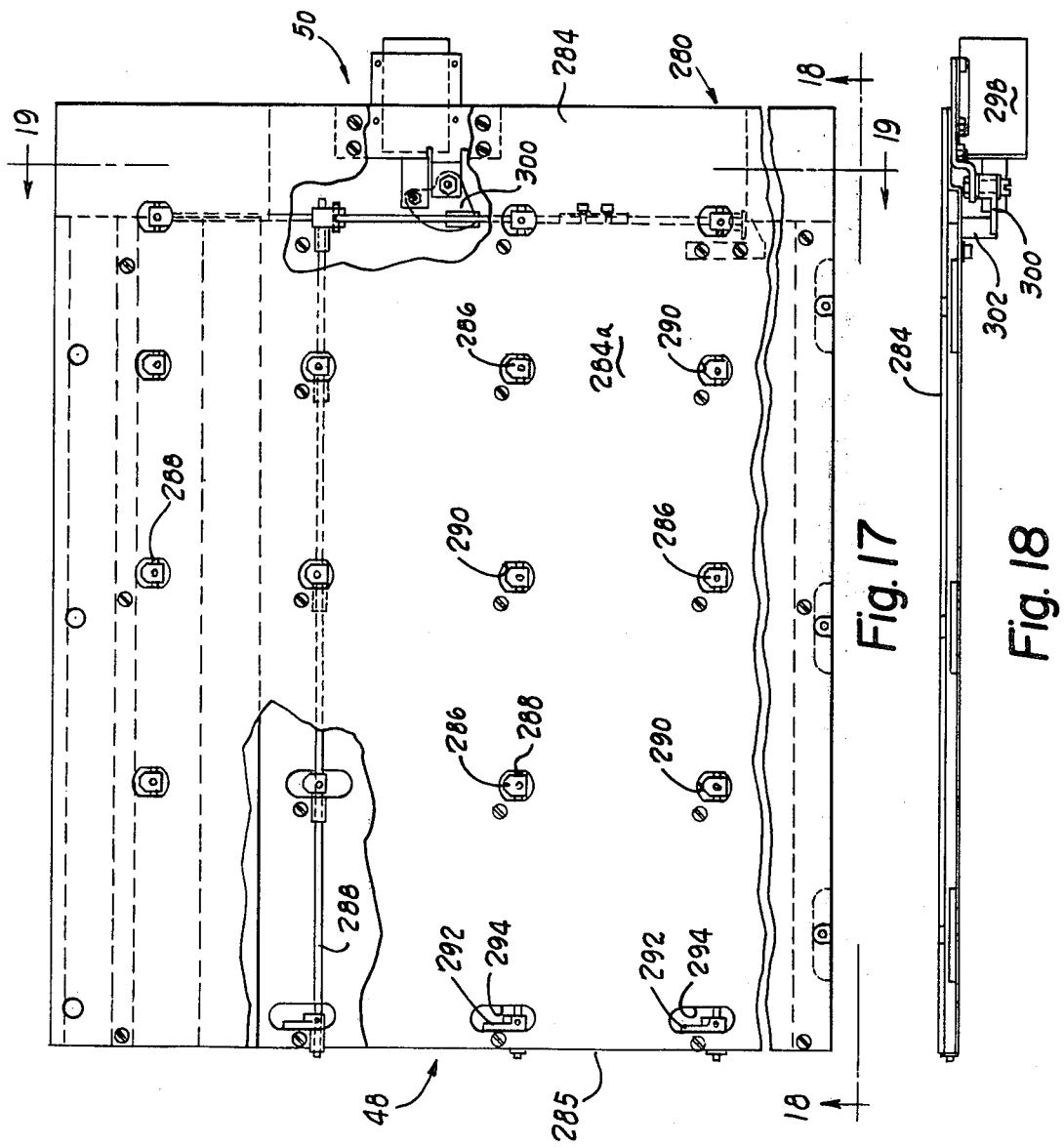
FIG. 17 is a top plan view of a rear load support plate constructed in accordance with the preferred embodiment of the invention.

According to this feature of the invention, a means is provided for elevating the film cassette during the loading sequence, comprising a rear load plate assembly 280 (shown in FIGS. 17-19) and a front load plate assembly 282 (shown in FIGS. 20 and 21). The rear assembly 280 includes a mounting plate 284 and a plurality of fingers 286 that are operative to extend above the top surface 284a of the plate 284 and vertically raise a film cassette during loading. The plate assembly 280 is suitably mounted in the rear of the filmer housing 30, below the cassette receiving opening 42. It is positioned so that the top surface 284a of the plate 284 is just below the plane of motion defined by the underside of the clamp members 140, 142, with an edge 285 of the plate 284 oriented towards the front of the filmer housing. As seen in FIG. 17, the fingers 286 are fastened to a series of parallel shafts 288 rotatably mounted to the bottom of the plate 284. The fingers 286 are positioned along the shafts 288 in alignment with spaced apertures 290 formed in the plate 284 and are eccentrically mounted so that partial rotation of the shafts 288 will cause a portion of the finger to rotate so that its top surface is above the top surface 284a of the mounting plate 284. In the preferred embodiment, an elongate cassette stop 292 is fastened to the left end of each shaft 288 in alignment with oblong apertures 294 such that when the shafts 288 are rotated, the stops 292 extend well above the plate surface 284a and thus limit the distance to which a cassette can be inserted by an operator.

Figure 19:
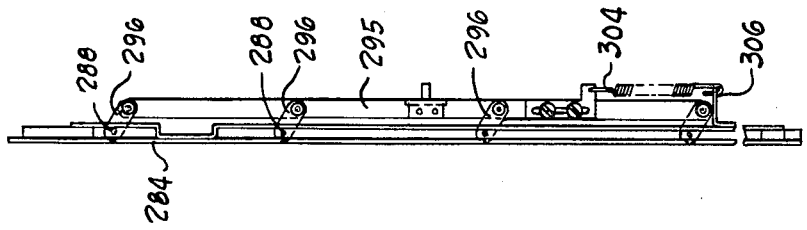
FIG. 19 is a sectional view of the support plate as seen from the line 19—19 in FIG. 17.
Figure 18:
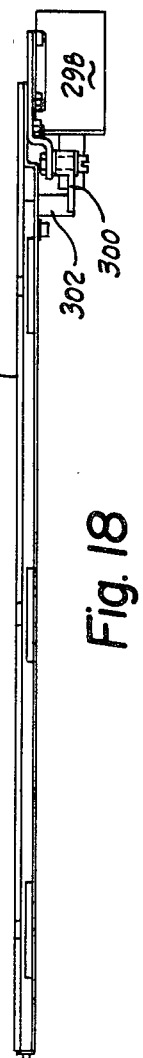
FIG. 18 is a side elevational view as seen from the plane indicated by the line 18—18 in FIG. 17.

Referring also to FIGS. 18 and 19, the shafts 288 are concurrently rotated by an actuating bar 295 that is pivotably attached to downwardly disposed actuating links 296 fixed to the right end of each shaft 288. Motion in the actuating bar 295 is imparted by a solenoid 298 that drives the actuating bar 295 upwardly (as viewed in FIG. 19) through a heart-shaped link 300 that is pivotably attached to the bottom of the plate 284 and which engages a downwardly extending tab 302 mounted to the actuating bar 295. A spring 304 extends between one end of the actuating bar 295 and a bracket 306 and is operative to return the actuating bar to its rest position whenever the solenoid 298 is deenergized. It should be apparent that the cassette stops 292 and the fingers 286 will raise above the surface 284a of the mounting plate 284 whenever the solenoid 298 is energized and will automatically return to the retracted position (shown in FIGS. 17-19) upon solenoid deenergization.

The front load plate assembly 282 is similar in function as the rear load plate assembly 280. The front assembly 282 is suitably mounted in the front end of the filmer housing 30 and is operative to elevate a film cassette during a front load sequence. The front load plate assembly 282 extends from the front cassette receiving opening 40 (shown in FIG. 1) to the frontal edge of the radiographic field area 64 (defined by the tie plate 60 shown in FIG. 3). In the preferred embodiment, the assembly 282 comprises a planar mounting plate 308 that mounts a plurality of spring biased buttons 310 at spaced locations on the plate, which extend through apertures formed in the plate 308. The front access door 44 is mounted to the front end of the plate 308 by means of support brackets 314. The support brackets 314 define a pivotal axis about which the door is hinged. A rotary solenoid 316 is mounted to the bottom of the plate 308 and is operatively connected to the door 44 by a linkage arrangement indicated generally by the reference character 318 and is operative to drive the cassette door between closed and open positions indicated in FIG. 21. A pair of spiral springs 320 bias the door towards the closed position so that the door will reclose whenever the solenoid is deenergized.

Cassette Advancing Apparatus

According to the invention, a mechanism is provided for advancing the film cassette 260 to a predetermined position along the clamp members 140, 142. A portion of the mechanism is mounted to the clamp member 142 and a portion is mounted along the left side of the filmer housing 30. The clamp mounted portion is best seen in FIGS. 22 and 23 while the housing mounted portion is best seen in FIG. 24. Referring to FIGS. 22 and 23, a drive in the form of a toothed belt 330 is supported for movement along the outboard side of the clamp member 142 by a pair of pulleys 332, 334. The pulley 332 is mounted to the side of the U-channel section 142a by a suitable support bracket 336 and associated fasteners 338. The pulley 334 is supported for rotation by a rotatable shaft 340 journalled in bushings 341 mounted in the clamp member 142. An elongate shaft 342 is mounted just below and parallel to the lower run 330a of the belt 330 by means of an L-shaped bracket 344 on one end and a suitable threaded fastener 346 that axially mounts the other end of the shaft 342 to a projecting tab 348 formed on the one end of the clamp member 142. A cassette advancing pawl 350 is slidably mounted on the shaft 342 and includes a projecting portion 350a (see FIG. 15) that extends through a slot 354 formed in the side of the clamp member 142 (shown in FIG. 23). A pawl biasing spring 356 is coaxially mounted with the shaft 342 and urges the cassette advancing pawl towards the pulley 334. The pawl 350 is also attached to the lower run 330a of the toothed belt 330 by a clamp 358. It should be apparent that movement in the pawl 350 will cause attendant movement in the belt 330 effecting rotation of the pulleys 332, 334.

The shaft 340 (to which the pulley 334 is fixed) is operatively connected to a brake assembly which comprises a sleeve 362 pinned to the shaft 340 and a spiral spring 364 mounted coaxially with the sleeve 362. Referring also to FIG. 16, one end of the spring 364 is fixed by a pin 366 that is attached to the clamp member 142. The other end of the spring is connected to the upper control lever arm 220a by a tension spring 368 and fastener 369. As seen in FIG. 16, movement of the lever arm 220a towards the right will cause rotation of the spring 364 in a "counter-coil" direction. The spring 364 is sized so that when in its relaxed state, the inside diameter frictionally grips the circumferential surface of the sleeve 362. The increase in diameter that occurs when the spring is rotated in the counter-coil direction upon rotation of the control lever 220 which will occur when one of the arms 220a, 220b contacts its associated detent block 240, 242, causes the spring 364 to release its grip on the sleeve 362 and allows the pawl biasing spring 356 to drive the advance pawl 350 to the initial or load position adjacent the pulley 334 (shown in FIG. 15).

Turning now to FIG. 24, the housing mounted portion of the cassette advancing mechanism comprises a drive assembly mounted in the left rear corner of the spotfilmer. It includes a reversible motor 370, preferably a servomotor, that is operatively connected to a pusher assembly 374 and a potentiometer 376 by a drive chain 378 and a toothed drive belt 380, respectively. The pusher assembly 374 includes a laterally extending arm 374a that is engageable with the cassette advancing pawl 350 (shown in FIG. 22). The pusher assembly is slidably mounted for reciprocating motion along a guide rod 382. The assembly is also clamped to the belt 378 so that rotation of the motor 370 will cause linear motion in the pusher assembly along the rod 382. The potentiometer 376 is rotated concurrently with movement of the pusher assembly 374 and consequently, its resistance will be a function of the position of the pusher assembly along the guide rod 382.

The pusher assembly 374 is engageable with the cassette advance pawl 350 (mounted to the clamp member 142) whenever the carriage assembly 80 and the clamp member 142 are in the position shown in FIG. 15 i.e., the clamp member 142 is in alignment with the detent blocks 240, 242. With the carriage assembly and clamp member in this position, energizing the advance servomotor 370 drives the pusher assembly 374 towards the front of the filmer housing. The pusher assembly eventually contacts and drives the advance pawl 350 along the clamp member 142, which in turn contacts and drives the film cassette 260 held between the clamp members 140, 142 towards the front of the filmer housing. Referring also to FIGS. 5 and 11, the film cassette 26 is driven by the cassette advancing mechanism until a corner 260a of the cassette abuts a cassette stop 390 (see FIGS. 5 and 22) formed by an L-shaped lever arm 390a pivotally attached to the clamp member 142 by a pin 392 and bracket 394 suitably fastened to the side of the clamp member 142. A spring 395 biases the lever 390a towards the position shown in FIG. 22.

After the film cassette 260 contacts the stop 390, the cassette advance drive motor 370 is deenergized. The resistance of the potentiometer 376 driven by the output shaft of the servo motor 370 will be a function of the distance traveled by the cassette advancing pusher assembly 374. More specifically, the distance travelled by the assembly 374 will be a function of the longitudinal or "X" dimension of the loaded film cassette and thus the potentiometer 376 can be used to provide a signal indicative of cassette size.

The brake assembly mounted to the clamp member 142 (formed by the sleeve 362 and the spring 364) locks the cassette advance pawl 350 in the advanced position and thereby insures that the film cassette remains against the stop 390. The advance pawl 350 will be driven to its initial or load position (immediately adjacent the pulley 334) by the spring 354 whenever the carriage assembly 80 operatively contacts one of the detent blocks 240, 242. Rotation of the control level 220 by the detent blocks causes the arm 220a to actuate the spring 364 in the counter-coil direction thereby releasing the sleeve 362.

Cassette Sensing Apparatus

The pivotally mounted cassette stop 390 serves a two-fold purpose. As noted above it provides the abutment against which the cassette is driven by the cassette advancing mechanism. It also is used to sense an improperly loaded cassette. The arm 390a is operatively connected to an electrical sensor switch 396 mounted to the side of the clamp member 142 by a bracket 398 and suitable fasteners 399. Should a cassette be clamped with an edge beyond the end of the lever arm 390a, the arm will pivot clockwise and operate the sensor 396 to provide a signal to the spotfilmer control system that the clamped cassette is improperly positioned along the clamp members 140, 142.

In the preferred embodiment, the clamp members 140, 142 include a clamping force sensor to insure that a film cassette is clamped securely between the clamp members 140, 142. Referring to FIG. 22, the sensor comprises a sensor switch 400 mounted to the horizontally extending cassette support plate 160. The sensor 400 includes a switch arm 402 that extends into abutting contact with a resilient actuator arm 404 that is mounted along the inside of the clamp member 142. The actuating arm 404 is preferably constructed from a strip of spring steel and includes a projecting contoured portion 404a that is compressed between the inside of the U channel section 142a and a clamped cassette. The deformation of the contoured portion 404a that occurs whenever a cassette is properly clamped, causes the longitudinal extent of the actuating arm 404 to increase thereby actuating the switch operating arm 402. A similar switch and actuating arm are provided on the clamp member 140.

Returning now to FIG. 7, the electrical communication between the sensor switches 396, 400 and the switch mounted in the clamp member 140 (not shown) are made through a contact board 410 mounted to the clamp member 142, having two pairs of electrical contacts 412, 414. As seen in FIG. 7, the communication between the sensor switch (not shown) in the clamp member 140 and the contact board 410 is made through a wire 416 that is coiled around a guide 418 mounted to the bracket 202 that extends into sliding contact with a small throughbore 419 (shown in FIG. 23) formed in the clamp lock mounting bracket 208 fastened to the clamp member 142 (see FIG. 15). Referring to FIG. 3, two pairs of contact blades 420, 422 are mounted in the vicinity of the detent blocks 240, 242, respectively. The contact blades 420, 422 are positioned to effect contact with the respective contacts 412, 414 on the contact board 410 whenever the clamp member 142 is driven into engagement with the detent blocks 240, 242. The cassette sensing system formed by the clamp mounted sensors (396, 400, etc.) is operative to sense clamping conditions whenever the clamp member 142 is in contact with one of the detent blocks 240, 242.

Operating Sequence and Method

To load a film cassette into the spotfilmer, the operator selects either the front load or rear load mode by depressing the appropriate cassette load button. A front load button 430 is located on the front operator panel 32 and a rear load button 432 (shown in FIG. 3) is located on the housing tie bar 56. When front loading is selected, the solenoid 316 is energized to open the front access door 44 and the rear door 46 is locked to prevent opening. When rear loading is selected, the rear access door 46 is unlocked and the front access door 44 remains closed.

Figure 25:
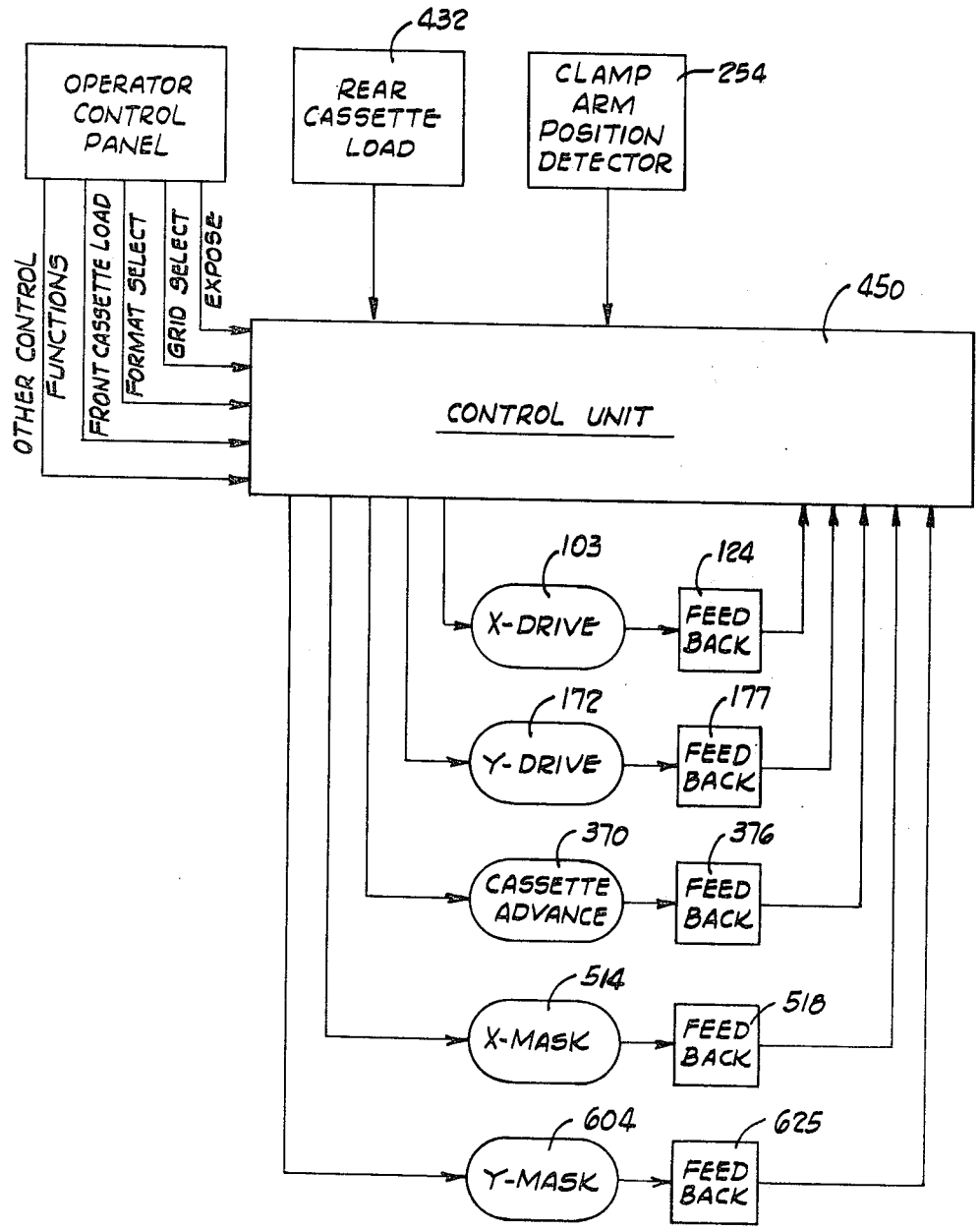
FIG. 25 is a schematic representation of a control system for controlling the operation of the spotfilmer.

FIG. 25 diagrammatically illustrates a spotfilmer control system that includes a control unit 450 suitably interfaced to the operator control and display panel 32; the various drive systems; and, the other control and sensing devices mounted in the filmer. Those skilled in the art will recognize that the control unit 450 may include a suitable hardwired control circuit for controlling the spotfilmer. Preferably, the control unit 450 employs microprocessor technology and a suitable control program for executing the control and operating functions described herein.

In order to load a film cassette from the front of the filmer housing, the carriage assembly 80 must be driven to its frontmost position within the housing and the clamp members 140, 142 must be driven to the outer extremes of the carriage assembly 80. Referring also to FIGS. 5, 6 and 10, the front load sequence is as follows. Depression of the front cassette button 430 by the operator will energize the X-drive (servomotor 103) to translate the carriage assembly 80 to its "park" position at the rear of the spot filmer housing. It must be remembered that in the park position, the carriage assembly is spaced a predetermined distance from the detent block 240 so that it will not interfere with transverse movement in the clamp member 142. The feedback potentiometer 124, operatively connected to the X-drive, will indicate the position of the carriage assembly 80 to the control system.

The Y-drive (servomotor 172) is then energized to scan or locate the position of the clamp member 142. It will be recalled that the clamp members 140, 142 are locked together when the carriage assembly is in the park position. The Y-drive will translate the clamp members along the carriage frame until the clamp arm position detector 254 (Hall effect sensor) detects the clamp member 142 (via the clamp mounted magnet 250) causing the control system to deenergize the Y-drive. The X-drive 103 is then reenergized to drive the carriage assembly 80 to the front of the filmer housing until the upper detent arm 220a (see FIGS. 15 and 16) contacts and is rotated by the detent block 242. It will be appreciated that in this position, the clamp members 140, 142 are disengaged and the clamp member 140 is free to move independently of the clamp member 142 which, as discussed previously, is laterally restrained by the detent block 242. The Y-drive 172 is then energized by the control system to translate the clamp member 140 away from the clamp member 142 until the clamp member 140 reaches its outermost position in the carriage assembly 80, whereupon the Y-drive is deenergized by the control system. With the carriage assembly 80 and clamp members in this position, the spotfilmer is prepared to receive a film cassette through the front access opening 40 and, accordingly, the front access door 44 is then opened by the solenoid 316. Upon insertion of the film cassette, the operator reinitiates the load sequence (by repressing the front load button 430) which energizes the Y-drive 172 in the reverse direction and causes the clamp member 140 to be driven towards the clamp member 142 until the cassette is clamped between the clamp members. A suitable control circuit, forming part of the control system, senses a clamped cassette, i.e., motor stall current sensing circuit, and deenergizes the Y-drive. Once a cassette is properly clamped, the X-drive 103 is reversed to drive the carriage assembly 80 to the park position in the rear of the spotfilmer housing.

The rear load sequence is similar to the above described front load sequence. The rear load sequence is initiated by depressing the cassette button 432 mounted at the rear of the filmer housing. Depression of the control button, energizes the X-drive 103 to translate the carriage assembly 80 to its park position. The Y-drive 172 is then energized to scan the position of the clamp member 142. The Y-drive, as before, is deenergized once the member 142 is detected by the sensor 254. At the conclusion of this step in the operation, the clamp member and carriage assembly will be in the position shown in FIG. 15. The X-drive 102 is then reenergized to drive the carriage assembly towards the rear of the housing until the control lever arm 220b contacts and is operated by the detent block 240. The Y-drive 170 is then reversed by the control system and translates the clamp member 142 to its outer position within the carriage assembly. At this point in the sequence, the carriage 80 is ready to accept a film cassette and accordingly, the rear door is unlocked allowing access to the interior of the housing. Once the cassette has been inserted by the operator, the load sequence is reinitiated and the control system then executes the following clamping sequence. The rear load plate solenoid 298 is energized in order to raise the fingers 286 above the top surface 284a of the load plate 284 thereby elevating the film cassette. The Y-drive 172 is then energized to drive the clamp member 140 towards the clamp member 142. Once properly clamped, the Y-drive is deenergized and the X-drive reenergized to drive the carriage assembly away from the detent block 242 and into its park position, thereby reengaging the clamp lock 206. It should be apparent, that the clamp members 140, 142 will translate within the carriage assembly 80 as a unitary clamp whenever the Y-drive is energized and the carriage assembly 80 is not in contact with the detent blocks 240, 242.

Cassette Size Sensing Method

According to a feature of the preferred embodiment, the size of the film cassette loaded by the operator is measured by the control system as part of the loading sequence. This feature is accomplished in conjunction with the feedback potentiometer 177, operatively connected to the Y servo motor 172 and the potentiometer 376 operatively connected to the cassette advance motor 370. As described above, the carriage assembly 80 is driven to its park position at the rear of the film housing at the conclusion of the loading sequence. The control system then executes the following cassette measuring sequence. The Y-drive 172 is energized to align the clamp member 142 with the magnetic sensor 254. This establishes the position of the left edge 260b of the film cassette 260 (see FIG. 5). The Y-drive potentiometer 177 in turn monitors the position of the clamp member 140 and consequently establishes the position of the right edge 260c of the film cassette. In short, the resistance of the potentiometer 177 will be a direct function of the "Y" dimension of the film cassette whenever the clamp member 142 is positioned over the magnetic sensor 254. The control system includes circuitry for receiving and storing the signal from the Y potentiometer 177.

At this point in the operational sequence, the clamp member 142 is aligned with the detent block 240. The X-drive 103 is then energized to drive the carriage assembly 80 against the detent block 240. In the preferred method, the Y-drive 172 is energized momentarily to slightly separate the clamp members 140, 142 thereby releasing the clamping force on the film cassette 260. The cassette advance motor 370 is then energized to drive the pusher assembly 374 into driving contact with the advance pawl 350 mounted to the side of the clamp member 142. The advance pawl 350 will in turn drive the film cassette along the clamp members until the left front corner 260a abuts the stop 390. The advanced position of the film cassette 260 is shown in FIG. 11. Once the film cassette 260 contacts the cassette stop 390, further movement in the advance pawl 350 is inhibited. Suitable circuitry forming part of the control system 450 detects that the film cassette 260 has been driven to its frontmost position along the clamp members 140, 142 and deenergizes the cassette advance system. It should be apparent that the final position of the pusher assembly 374, as monitored by the cassette advance potentiometer 376, is a function of the longitudinal dimension of the film cassette. Suitable circuitry within the control system receives and stores the signal from the feedback potentiometer 376 when the advance pawl 350 reaches its final position along the arms.

In the preferred embodiment, the X-drive 103 continues to drive the carriage assembly 80 towards the rear of the filmer housing during the cassette advancing step so that the assembly 80 remains in the rearmost position. The control system 450 continuously monitors the cassette advance potentiometer 376. When the film cassette 260 reaches the cassette stop 390 and inhibits further movement in the advance pawl 350, the cassette advance drive system will stall and the potentiometer 376 will cease to rotate. The control system senses this condition and stores the final signal from the potentiometer which is used to derive the longitudinal dimension of the cassette.

As soon as the carriage assembly moves away from the detent block 240, the position of the advance pawl 350 is locked due to the engagement of the brake assembly mounted to the clamp member 142 formed by the sleeve 362 and spring 364. It should be recalled, that the advance pawl 350 will be returned to its initial position whenever the clamp member 142 is driven into contact with one of the detent blocks 240, 242 which as explained earlier, causes the release of the brake assembly and allows the pawl biasing spring 356 to drive the advance pawl 350 towards the pulley 334.

Masking Apparatus

According to another feature of the exemplary embodiment, a film masking apparatus is provided for delimiting the x-ray beam in both the x and y directions thereby defining the radiographic image area on a film cassette when the film cassette is positioned in the x-ray field. In the preferred embodiment, the masking apparatus includes pairs of shutter-like members that are driven towards and away from each other by a drive system that preferably includes servomotors and feedback potentiometers for monitoring the position of the masks.

Figures 27, 28:
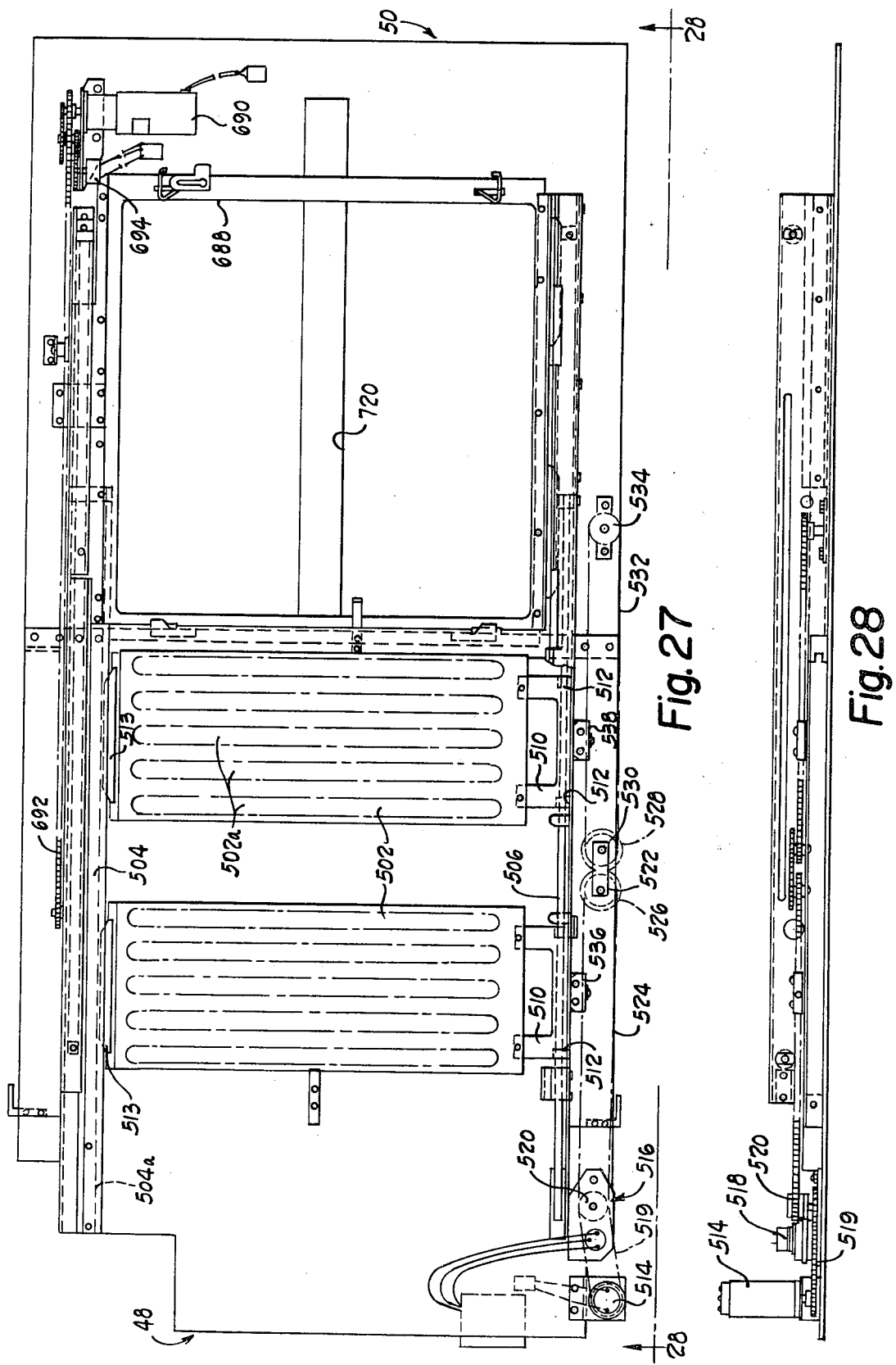
FIG. 27 is a top view of the support plate showing the construction of an "X" mask assembly, constructed in accordance with the preferred embodiment.
FIG. 28 is a side elevational view as seen from the plane indicated by the line 28—28 in FIG. 27.

The X-ray masking apparatus and an X-ray grid apparatus (to be described) are mounted to a support plate 500. Referring to FIG. 24, the support plate 500 also serves as part of the spotfilmer housing. The plate 500 sits on top of, and is fastened to, the lower legs of the U-channels 52, 54 and provides the necessary rigidity to the bottom of the filmer housing. In order to facilitate the description of the apparatus, only portions of the masking and grid apparatus are shown on the mounting plate 500 in any one figure. For example, FIGS. 24 and 26 illustrate the construction and mounting of the X-ray grid assembly. FIGS. 27 and 28 illustrate the construction and mounting of an "X" mask assembly. FIGS. 29 and 30 illustrate the construction and mounting of a "Y" mask assembly.

FIGS. 27 and 28 illustrate the construction of the masking assembly that delimits the x-ray beam in the "X" direction and for this reason is termed the "X" mask assembly. The reference characters 48, 50 indicate the front and rear of the plate 500 with respect to the filmer housing. A pair of shutter-like members 502 are reciprocally mounted on the mounting plate 500. Preferably, one side of each of the members 502 is slidably located within a longitudinal slotted guide 504 mounted along the left side of the mounting plate. The other sides of the members 502 are slidably supported by support shaft 506 that extends along the side of the plate 500. The mask members 502 comprise lead plates that include reinforcing members 502a to provide the needed rigidity. A U-shaped bracket 510 is suitably fastened to the edge of each of the members 502 and carries bushings 512 that slidably engage the guide shaft 506. A tongue-like guide projection 513 is fastened to the opposite edge of each of the plates 502 and slidably engages a slot 504a formed in the guideway 504.

Concurrent motion towards and away from each other is imparted to the members 502 by a drive system that comprises a reversible motor 514, preferably a servomotor, that drives an intermediate sprocket assembly 516 and a feedback potentiometer 518 through a drive belt preferably a chain 519. A transfer sprocket 520 forming part of the sprocket assembly 516 drives a sprocket 522 by means of a drive chain 524. The sprocket 522 is attached to a gear 526 which drives an adjacent, mating gear 528 that in turn is connected to a drive sprocket 530. The drive sprocket 530 drives a drive chain 532 that is reeved around an idler sprocket 534 suitably attached to the mounting plate 500. As seen in FIG. 27, the mask mounting brackets 510 are operatively attached to the drive chains 524, 532, by clamps 536, 538, respectively. It should be apparent that energizing the servomotor 514 will effect motion in the drive chains 524, 532 in opposed directions and will cause motion in the mask members 502 towards or away from each other depending on the direction of rotation of the servomotor. The resistance of the feedback potentiometer 518 will be a function of the position of the mask members and thus is utilized by the control system to drive the mask members to predetermined positions within the X-ray field 64 to define one dimension of an X-ray field area.

The "Y" mask apparatus, as seen in FIGS. 29 and 31 comprises two pairs of relatively movable, shutter-like plates, indicated generally by the reference characters 600, 602 and a drive system including a reversible motor 604, preferably a servo motor. Referring also to FIG. 31, the "Y" mask 600 includes relatively movable inner and outer elements 600a, 600b; the "Y" mask 602 includes similar elements 602a, 602b. The "Y" masks 600, 602 are shown in their fully extended positions in FIG. 29. When fully retracted, the inner elements 600a, 602a overlie the respective outer elements 600b, 602b, thus maximizing the size of the imaging area (in the Y direction) on a film cassette positioned in the x-ray field area. Each mask 600, 602 is constructed of an x-ray absorptive material such as lead and includes reinforcing ribs 606 which serve to rigidize the members. The left sides of the outer mask elements 600b, 602b (as viewed in FIG. 29) are attached to U-shaped brackets 607 which are laterally and vertically supported by a guide shaft 608 mounted transversely with respect to the support plate 500 by a pair of L-shaped brackets 610. The elements 600b, 602b are slidably supported on the right by a slotted trackway 612 transversely mounted across the support plate 500.

The left sides of the inner elements 600a, 602a are attached to U-shaped brackets 614 which are also slidably supported by the guide shaft 608. The right sides of the inner elements 600a, 602a are slidably engaged by separate slotted guide tracks 616, 618 mounted to the top of the respective outer elements 600b, 602b.

According to this feature of the invention, the inner elements 600a, 602a are actuated at a speed greater than the actuation speed of the outer elements 600b, 602b so that both elements of a pair, for example elements 600a, 600b, simultaneously reach their fully extended or retracted positions. It should be appreciated that the distance travelled by inner plate elements 600a, 602a in travelling from their retracted to their extended positions is greater than the distance travelled by the outer plate elements 600b, 602b.

In order to accomplish this feature of the invention, a drive system is provided for driving the elements 600a, 602b at a greater linear speed than the elements 600b, 602b. Referring in particular to FIGS. 30 and 31, the servo motor 604 includes a right angle drive 620 having an output shaft 622 that extends below the support plate 500 (shown best in FIG. 30). A drive sprocket 624 fixed to the end of the shaft 622 drives a feedback potentiometer 625 and a compound sprocket assembly 626 by means of a chain 628 that is also reeved around an idler sprocket assembly 630. The compound sprocket assembly 626 includes a gear 626a that drives an adjacent compound sprocket assembly 632 having a gear 632a (shown best in FIG. 34) that mates with the gear 626a. The sprocket assembly 626 includes a mask drive sprocket 626b that drives a first mask drive chain 636 around an intermediate sprocket assembly 638 (see FIG. 33) and an idler sprocket 640 (see FIG. 32). The intermediate sprocket assembly 638 includes an input drive sprocket 638a and a mask drive sprocket 638b that drives a second mask chain 642 around an idler sprocket 644.

Referring in particular to FIG. 31, the mask drive chains 636, 642 drivingly engage the mask elements 600a, 600b, respectively. A clamp 646 is fastened to the drive belt 636 and is attached to the U-shaped bracket 614 by suitable fasteners 648. It should be apparent that motion in the drive chain 636 will impart rectilinear motion to the element 600a towards and away from the center of the x-ray field depending on the direction of rotation of the servo motor 604. A clamp 650 is attached to the inner drive belt 642 and is fastened to the C-shaped guide bracket 607 by suitable fasteners 652. Because the drive chains 636, 642 are driven by sprockets having unequal diameters, the elements 600a, 600b will be driven at unequal speeds. Specifically, the sprocket 638b is smaller than the sprocket 638a and thus the speed of the inner element 600a will be greater than the speed of the outer element 600b. Those skilled in the art will recognize that by properly sizing the sprockets 638a, 638b the relative actuating speeds of the elements 600a, 600b can be adjusted so that both elements will reach their fully extended and retracted positions simultaneously. As seen in FIG. 29, the mask elements 602a, 602b are driven in substantially identical fashion as the members 600a, 600b.

The potentiometer 625 forms part of a servo feedback system which enables the control system to drive the masks to predetermined positions within the X-ray field 64. It should be apparent that the "X" and "Y" masks together can define a plurality of radiographic imaging areas to accommodate a multitude of cassette sizes and filming formats.

X-ray Grid Apparatus

In the preferred embodiment, the mounting plate 500 also supports an X-ray grid assembly. As is well known, an x-ray grid is usually disposed intermediate a film cassette and the subject being irradiated and serves to absorb scatter radiation that would normally fog or reduce the resolution of the radiographic image. Returning to FIGS. 24 and 26, the grid assembly comprises a frame 670 for mounting a conventional X-ray grid (not shown) that is reciprocally supported by a longitudinal guideway 672 and guide shaft 674 mounted along opposite sides of the support plate 500 housing and above the x-mask assembly. A drive system comprising a reversible motor 676, preferably a servo motor, drives a drive belt 678 along one side of the filmer housing and concurrently drives a feedback potentiometer 580. The grid frame 670 is fixed to the drive belt 678 by means of a clamp 682 that extends from the grid frame 670. Energizing the servomotor 676 will cause the grid frame 670 to move towards or away from the X-ray field 64, depending on the direction of rotation. The resistance of the potentiometer 580 will be a function of the frame position within the filmer housing and is utilized by the control system to drive the grid between exposure and retracted positions within the housing.

Referring to FIG. 27, another grid assembly 688 for driving a "cross-grid" is preferably mounted in a similar fashion immediately above or below the grid frame 670 and preferably includes a separate drive system for driving the cross grid between exposure and retracted positions that includes a servomotor 690, a drive belt 692 and a feedback potentiometer 694. The grid assembly may also include a means for oscillating the grid during an x-ray exposure to prevent the formation of grid lines on the radiograph. One such apparatus for accomplishing oscillation in the grid frame 688 can be found in the application of Robert J. Vagi Ser. No. 209,309 filed concurrently herewith and entitled Radiation Imaging System with Cyclically Shiftable Grid Assembly.

Cone Drive Apparatus

In accordance with the invention, the support plate 500 mounts a cone drive system for driving the palpitator cone 50 (shown in FIG. 2) between operative and retracted positions. Referring to FIGS. 29, 35 and 36, the cone drive includes a reversible motor 700, preferably a servomotor transversely mounted at the rear of the support plate 500. The motor 700 drivingly engages a drive chain 702 reeved around a sprocket assembly 704 and under an idler assembly 706 mounted adjacent the drive motor 700. A cone drive assembly 708 is attached to the bottom run 702a of the drive chain 702 and is releasably fastened to the palpitator cone 50 so that movement in the drive chain 702 will impart rectilinear motion in the cone towards and away from the front of the filmer, depending on the rotation of the motor 700. A pair of limit switches 710, 712 are mounted at the extremes of travel of the cone drive assembly 708 and are located so that respective actuating arms 710a, 712a will be actuated by a side surface 708a of the drive assembly 708. The switches 710, 712 define cone-advanced and cone-retracted positions for the drive assembly 708 and hence determine the operative and retracted positions of the palpitator cone 50.

In a preferred embodiment, the cone drive assembly 708 is supported for sliding motion within an elongate opening 720 (shown in FIG. 27) formed in the mounting plate 500. Referring also to FIG. 37, a pair of longitudinal tracks 730, 732 are suitably fastened along the sides of the opening 720 and slightly overhang the opening. The drive assembly 708 includes a pair of slots 708b which slidingly engage the longitudinal edges of the tracks 730, 732. A U-channel housing 734 is fastened over the opening 720 and covers a substantial portion of the drive chain 702.

According to this feature of the invention, a cone lock is provided which automatically locks the position of the cone in its operative position. FIG. 38 diagrammatically illustrates the construction and operation of the cone lock. In the preferred embodiment, a latch 740 is mounted to the cone drive assembly 708 on a pivotal axis 742. A tension spring 744 biases the latch 740 downwardly. A keeper 746 is located near the sprocket assembly 704 and is engageable with the latch 740 whenever the drive assembly 708 is driven to the cone advanced-position. The keeper 746 includes a ramp surface 746a for raising the latch 740 during leftward movement of the drive assembly 708, and a vertical locking surface 746b for preventing rightward movement.

As seen in FIGS. 36 and 38, one end 748 of the chain 702 is attached to the latch 740 while the other end 750 is attached directly to the drive assembly 708. The end 748 of the chain 702 is fastened to the latch 740 a spaced distance from the pivotal axis 742 and defines a moment arm 740a. Whenever the drive motor 700 is energized to retract the cone, the retracting force will be applied to the drive assembly 708 by way of the latch 740. The retraction force will cause the latch 740 to pivot upwardly, releasing the keeper 744, thereby allowing the drive assembly 708 to move to the right. When the drive motor 700 is energized to advance the cone, the chain 702 pulls the assembly 708 to the left. The chain tension between the latch 740 and the drive motor 700 is relieved, allowing the latch to pivot downwardly under the action of the spring 744. The latch 740 will then engage the keeper 746 when the drive assembly 708 reaches the cone advanced position. The application of Robert Hunt et al entitled "Spotfilming Apparatus and Method" filed concurrently herewith is hereby incorporated by reference.

Although the invention has been described with a certain degree of particularity, various changes can be made to it by those skilled in the art without departing from the spirit or scope of the invention as described and hereinafter claimed.

We claim:

1. A masking apparatus for an X-ray spot-filmer, comprising:
   (a) a first pair of shutter-like members constructed of radiation absorptive materials;
   (b) guide means for slidably supporting said members for motion in a first direction;
   (c) drive means operatively connected to said members for imparting reciprocating motion towards and away from each other;
   (d) a second pair of shutter-like members constructed of radiation absorptive material, each member including first and second relatively movable elements;
   (e) guide means for slidably supporting said second pair of members for motion in a direction substantially transverse to the direction of motion of said first pair of members;
   (f) drive means operatively connected to said second pair of members for imparting reciprocating motion towards and away from each other, said drive means actuating said first and second elements at first and second speeds, respectively.

2. The apparatus of claim 1 wherein each drive means includes a reversible motor and feedback potentiometer for monitoring the position of the respective mask members.

3. The apparatus of claim 1 wherein said second drive means comprises a pair of drive belts, one drive belt connected to said first element and said second drive belt connected to said second element, and said drive system includes means for driving said first and second drive belts at first and second speeds.

4. An X-ray spotfilmer comprising:
 (a) a spotfilmer housing;
 (b) means for clamping and transporting a film cassette within said housing between retracted and exposure positions;
 (c) a first pair of shutter-like members constructed of radiation absorptive material;
 (d) guide means slidably supporting said members intermediate an X-ray source and a film plane defined by a film cassette;
 (e) first drive means operatively connected to said members for imparting reciprocating motion towards and away from each other;
 (f) a second pair of shutter-like members constructed from radiation absorptive material, each member including first and second relatively movable elements;
 (g) guide means slidably supporting said second members intermediate the X-ray source and said film plane for motion in a direction substantially transverse to the direction of motion of said first pair of members;
 (h) second drive means operatively connected to said first and second elements and operative to drive said elements at first and second rectilinear speeds, respectively.

5. The apparatus of claim 4 wherein said first and second drive means each include a reversible motor and a feedback potentiometer for monitoring position of the respective mask members.

6. An X-ray spotfilming apparatus, comprising:
 (a) an X-ray source;
 (b) a spotfilmer housing including a means for clamping and conveying a film cassette between exposure and retracted positions within said housing;
 (c) a palpitator cone assembly mounted for movement along a surface of said spotfilmer housing and movable between retracted and operative positions and disposed intermediate the X-ray source and the cassette clamping and conveying means;
 (d) cone drive means operatively attached to said palpitator cone for driving said cone between the retracted and operative positions;
 (e) cone lock means for locking the position of said cone when said cone is driven to its operative position by said drive means;
 (f) said cone drive means including a means for releasing said lock means when said drive means is energized to retract said cone and further including a drive belt driven by a reversible motor and limit switches mounted in the path of movement of said cone lock means, said switches being operated by said lock means when said cone travels to predetermined positions.

7. The apparatus of claim 6 wherein said cone lock means comprises a pawl pivotally attached to a cone drive bracket and operatively connected to said drive means such that the driving force applied to said bracket by said drive means in retracting said cone, causes the release of said lock pawl.

8. The apparatus of claim 7 wherein said lock pawl is spring biased towards its locking position and said pawl is operative to engage a keeper, said lock pawl engageable with said keeper when said cone is driven to its operative position.

9. The apparatus of claim 7 wherein said drive bracket is slidable along a trackway formed in a spotfilmer support plate.

10. A masking apparatus for an X-ray spotfilmer, comprising:
 (a) a first pair of shutter-like members constructed of radiation absorptive materials;
 (b) guide means for slidably supporting said members for motion in a first direction;
 (c) first drive means operatively connected to said members for imparting reciprocating motion towards and away from each other;
 (d) a second pair of shutter-like members constructed of radiation absorptive material, each member including first and second relatively movable elements;
 (e) guide means for slidably supporting said second pair of members for motion in a direction substantially transverse to the direction of motion of said first pair of members;
 (f) second drive means operatively connected to said second pair of members for imparting reciprocating motion towards and away from each other, said second drive means comprising a pair of drive belts, one drive belt connected to said first element and said second drive belt connected to said second element, and said second drive means including means for driving said first and second drive belts at first and second speeds.

11. An X-ray spotfilming apparatus:
 (a) an X-ray source;
 (b) a spotfilmer housing including a means for clamping and conveying a film cassette between exposure and retracted positions within said housing;
 (c) a palpitator cone assembly mounted for movement along a surface of said spotfilmer housing and movable between retracted and operative positions and disposed intermediate the X-ray source and the cassette clamping and conveying means;
 (d) cone drive means operatively attached to said palpitator cone for driving said cone between the retracted and operative positions;
 (e) cone lock means for locking the position of said cone when said cone is driven to its operative position by said drive means, said cone lock means including a cone drive bracket operatively connected to said drive means, said bracket mounted for sliding movement along a trackway formed in a substantially central portion of a spotfilmer support plate;
 (f) said cone drive means including a means for releasing said lock means when said drive means is energized to retract said cone and further including a drive belt driven by a reversible motor and limit switches mounted in the path of movement of said cone lock means, said switches operatively engaged by said lock means when said cone travels to predetermined positions.

12. The apparatus of claim 11 wherein said trackway comprises, at least in part, an elongate slot disposed centrally in said spotfilmer support plate.

* * * * *